US012591170B2

(12) United States Patent
Doornaert et al.

(10) Patent No.: US 12,591,170 B2
(45) Date of Patent: Mar. 31, 2026

(54) OPTICAL PROJECTION WITH COMBINED BEAMS

(71) Applicant: BARCO NV, Kortrijk (BE)

(72) Inventors: Dries Jan Doornaert, Wevelgem (BE); Bart Henri Johanna Maximus, Oudenaarde (BE); Raveen Kumaran, British Columbia (CA); Dirk Leontina Maes, Bissegem (BE)

(73) Assignee: BARCO NV, Kortrijk (BE)

( * ) Notice: Subject to any disclaimer, the term of this patent is extended or adjusted under 35 U.S.C. 154(b) by 367 days.

(21) Appl. No.: 18/247,249

(22) PCT Filed: Oct. 1, 2021

(86) PCT No.: PCT/EP2021/077147
§ 371 (c)(1),
(2) Date: Mar. 29, 2023

(87) PCT Pub. No.: WO2022/069727
PCT Pub. Date: Apr. 7, 2022

(65) Prior Publication Data
US 2023/0375906 A1      Nov. 23, 2023

Related U.S. Application Data

(60) Provisional application No. 63/119,580, filed on Nov. 30, 2020.

(30) Foreign Application Priority Data

Oct. 2, 2020      (CA) ...................................... 3095177

(51) Int. Cl.
*G03B 21/00*          (2006.01)
*G03B 21/20*          (2006.01)

(52) U.S. Cl.
CPC ....... *G03B 21/005* (2013.01); *G03B 21/2033* (2013.01); *G03B 21/2053* (2013.01); *G03B 21/208* (2013.01); *G03B 21/2066* (2013.01)

(58) Field of Classification Search
CPC .... G03B 21/005; G03B 21/008; G03B 21/28; G03B 21/208; G03B 21/2013;
(Continued)

(56) References Cited

U.S. PATENT DOCUMENTS 9,939,719 B2      4/2018   Bommersbach et al.
9,952,418 B2      4/2018   Redford
(Continued)

FOREIGN PATENT DOCUMENTS

EP          0740178 A2      10/1996
JP          2002502200 A      1/2002
(Continued)

OTHER PUBLICATIONS

International Search Report mailed on Jan. 18, 2022 in International Patent Application No. PCT/EP2021/077147, 7 pages.

*Primary Examiner* — Sultan Chowdhury
(74) *Attorney, Agent, or Firm* — Kilpatrick Townsend & Stockton LLP

(57) ABSTRACT

Optical assemblies comprise plural spatial light modulators arranged to modulate light in plural light beams. The modulated light is combined in angular space by converging light beams onto a target area of an image plane. Light from the image plane may be received at an entrance pupil of an optical system. A diffuser may be provided to increase utilization of an acceptance angle of the optical system. The optical system may comprise an image projection system comprising an imager that is illuminated by the light from
(Continued)

the image plane. An example application of the described technology is cinema projection of scenes which include high luminance highlights.

17 Claims, 12 Drawing Sheets

(58) Field of Classification Search
CPC ............ G03B 21/2033; G03B 21/2053; G03B 21/2066; H04N 9/3102; H04N 9/3105; H04N 9/315; H04N 9/3126; H04N 9/3141; H04N 9/3152; H04N 9/3161; H04N 9/3164
See application file for complete search history.

(56) References Cited

U.S. PATENT DOCUMENTS

| | | | | |
|---|---|---|---|---|
| 9,983,402 | B1 * | 5/2018 | Jackson | ............... H04N 9/3152 |
| 10,386,709 | B2 | 8/2019 | Richards et al. | |
| 10,880,528 | B1 * | 12/2020 | Perkins | ............... H04N 9/3126 |
| 2009/0231723 | A1 | 9/2009 | Hall, Jr. et al. | |
| 2015/0124337 | A1 * | 5/2015 | Ito | ........................... G02B 13/22 |
| | | | | 359/733 |
| 2015/0146175 | A1 * | 5/2015 | Dewald | ............. G02B 27/1066 |
| | | | | 353/69 |
| 2017/0138545 | A1 * | 5/2017 | Minor | ........................ F21K 9/61 |
| 2019/0391476 | A1 | 12/2019 | Akiyama | |
| 2020/0089096 | A1 | 3/2020 | Pertierra et al. | |
| 2020/0249492 | A1 | 8/2020 | Maes | |
| 2020/0372844 | A1 * | 11/2020 | Kobayashi | ............. F21V 14/04 |
| 2023/0128980 | A1 * | 4/2023 | Lyubarsky | ........... G03B 21/208 |
| | | | | 353/31 |

FOREIGN PATENT DOCUMENTS

| | | | |
|---|---|---|---|
| JP | 2006504987 | A | 2/2006 |
| JP | 2015043083 | A | 3/2015 |

* cited by examiner

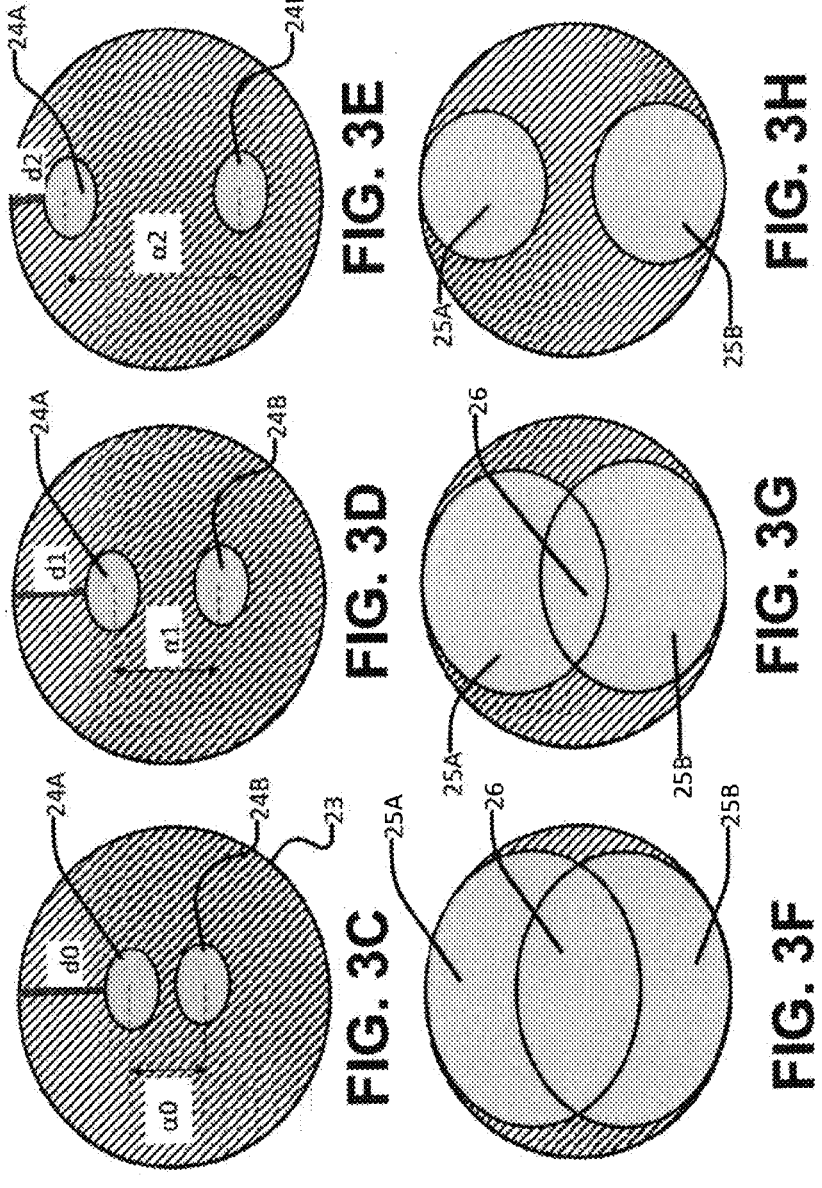

OPTICAL PROJECTION WITH COMBINED BEAMS

CROSS-REFERENCE TO RELATED APPLICATIONS

This application is a 371 National Stage filing of PCT Application No. PCT/EP2021/077147, filed 1 Oct. 2021, entitled OPTICAL PROJECTION WITH COMBINED BEAMS, which claims priority from Canadian application No. 3095177 filed 2 Oct. 2020 entitled OPTICAL PROJECTION WITH COMBINED BEAMS and U.S. application No. 63/119,580 filed 30 Nov. 2020 entitled OPTICAL PROJECTION WITH COMBINED BEAMS, which is are hereby incorporated herein by reference for all purposes. For purposes of the United States of America, this application claims the benefit under 35 U.S.C. § 119 of U.S. application No. 63/119,580 filed 30 Nov. 2020 and entitled OPTICAL PROJECTION WITH COMBINED BEAMS.

FIELD

The invention relates to combining beams of light. One example application of the invention is to illuminate a projector imager.

SUMMARY

This invention has many aspects. These include:
light projectors;
optical assemblies for combining light beams;
highlight projectors;
methods for combining and/or modulating light beams;
TIR prism assemblies;
methods for projecting images;
other innovations as described herein.

Some aspects of the invention supply light for high intensity highlights in projected images by combining plural light beams in which light is steered to highlight locations in an image plane. The plural light beams may illuminate the same set of one or more imagers. An advantage of some such embodiments is to substantially increase a light budget available for highlighting. An advantage of some such embodiments is increased reliability of spatial phase modulators that may be used for light steering which may be achieved by splitting optical power among plural phase modulators.

The technology described herein may be applied for example to provide a projected image having highlights with a total light flux budget of at least 4000 lumen over a 15000 lumen baseline in a large size cinema screen.

Some aspects of the invention provide an optical assembly comprising plural spatial phase modulators, each illuminated by a light beam from a highly collimated light source. A control system may set each of the phase modulators to apply phase shifts so as to steer light to a common target or image plane. The light steered by each phase modulator may provide a light field at the target that includes areas of greater light intensity and areas of less light intensity. The light fields may overlap at the target and may be co-registered so that corresponding areas in the overlapping light fields are superposed. The combination of the light steered by the different phase modulators may be effected by directing light from the different phase modulators to converge at an acute angle α.

The combined light field at the target may, for example illuminate an imager (such as a spatial amplitude modulator of any suitable type). In some embodiments, angles between the optical axes of each phase modulator to the common target image are smaller than ½, ⅓, ¼, ⅕, ⅙, etc. of a maximum boundary of an acceptance angle of an optical system that includes the imager. In some embodiments at least one optical diffuser is provided in an optical path between the common target and the imager. The optical diffuser may increase an angular spread of the combined steered light.

One aspect of the invention provides a projection system comprising one or more light sources operative to emit light and optical elements arranged to direct the light from the one or more light sources in two or more separate collimated beams. Each of the beams illuminates the active area of the imager. The beams converging onto the image plane at an acute angle not exceeding 10 degrees. The optical elements include a spatial light modulator arranged to modulate the light of at least one of the beams.

Another aspect of the invention provides systems and methods for supplying light for high intensity highlights in projected images. In some embodiments at least one modulated light beam (e.g. a light beam that is modulated by a spatial phase modulator) is combined with a base light beam (e.g. a beam that provides uniform illumination). The modulated light beam and the base light beam preferably have similar coverage in angular space. This advantageously allows for light from both the modulated light beam and the base light beam to be diffused using the same optical diffuser thereby increasing the angular extent of the combined modulated and base light beams without severe loss of light outside of an acceptance angle of a downstream optical system.

In some embodiments a holographic diffuser is provided in an optical path of the base light beam. In some embodiments the holographic diffuser acts as a static or "frozen" phase grating.

In some embodiments a base light beam having coverage in angular space that is similar to that of a modulated light beam is generated by collecting light from a separate light source (e.g. a laser light source) into an optical fiber (e.g. an optical fiber having a numerical aperture ("NA") 0.2 and about 2×1 mm cut). Light from the optical fiber and light from the modulated light beam may be projected (e.g. imaged) onto a common target image plane.

Further aspects and example embodiments are illustrated in the accompanying drawings and/or described in the following description.

It is emphasized that the invention relates to all combinations of the above features with one another and with any one or any combination of the features of the appended claims, even if these are recited in different claims.

BRIEF DESCRIPTION OF THE DRAWINGS

The accompanying drawings illustrate non-limiting example embodiments of the invention.

FIGS. 3C to 3H are schematic representations of example arrangements of footprints in an angular space.

DETAILED DESCRIPTION

Figures 1, 2:
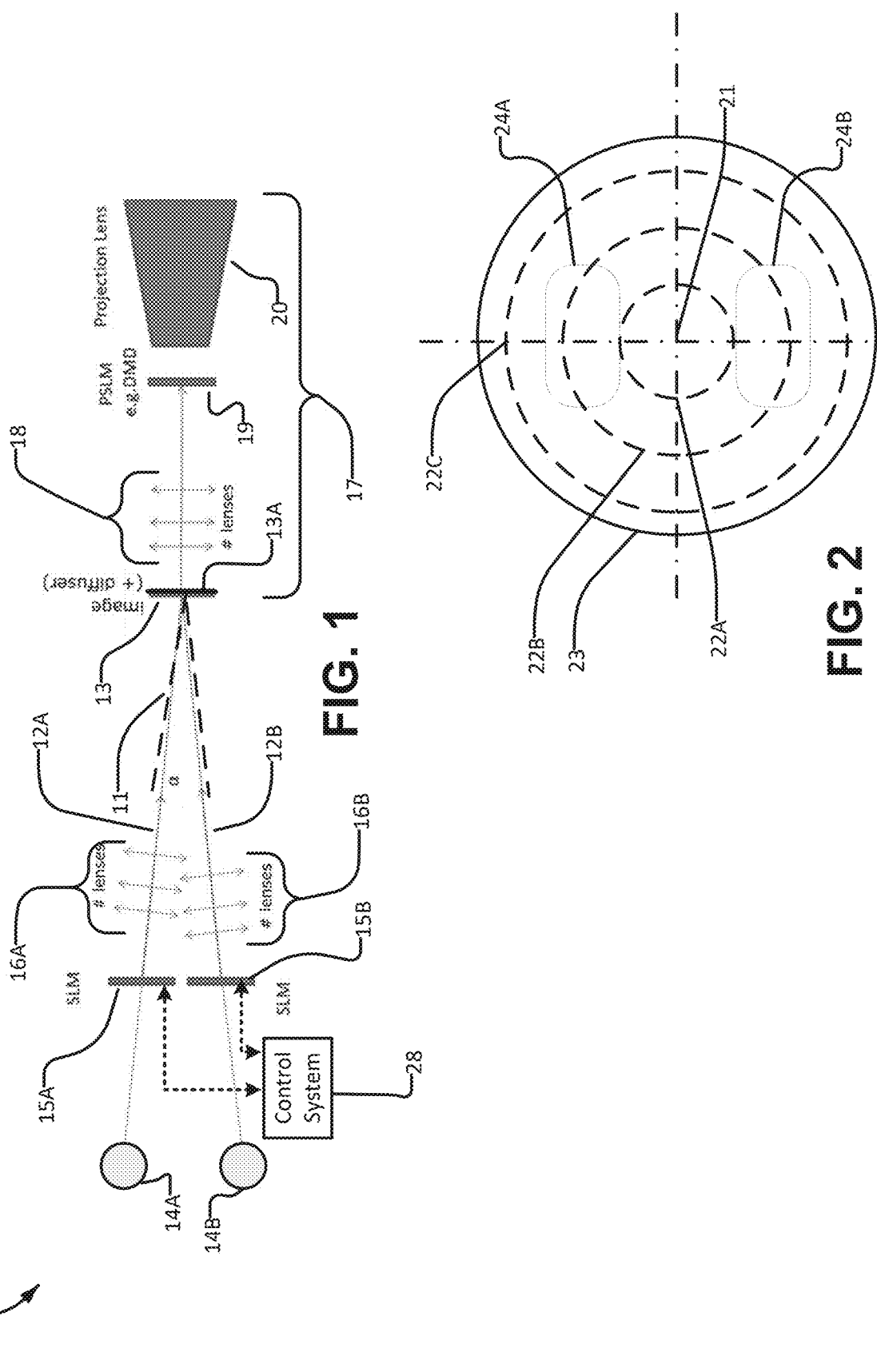
FIG. 1 is a schematic illustration of a projection system according to an example embodiment of the invention.
FIG. 2 is a schematic representation of an example angular space.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Definitions

"imager" is any device that is operable to impart a desired image (an image may be any pattern) to a beam of light. A spatial light modulator may be used as an imager. For example, in a cinema projector an imager may be used to modulate light incident from one or more light sources according to image data to project images according to the image data onto a screen.

"spatial light modulator" or "SLM" is a device that operates to apply different alterations to a property of light at different locations. Typically a SLM comprises an array of controllable elements or "pixels" that are individually operable to alter a property of light at a corresponding pixel location. Properties of light that may be altered by a SLM include amplitude (light intensity), polarization and phase. A SLM may modulate light that is transmitted through the SLM (e.g. light is incident on one face of the SLM and modulated light is emitted from another opposing face of the SLM). A SLM may modulate light that is reflected from one face of the SLM (e.g. light is incident on one face of the SLM and modulated light is emitted from the same face of the SLM).

"spatial amplitude modulator" or "SAM" means a type of SLM that is operable to controllably alter amplitude of light. Non-limiting examples of SAMs are liquid crystal panels (also called LCDs), liquid crystal on silicon (LCoS) devices and digital mirror devices ("DMDs") device.

A "spatial phase modulator" or "SPM" is a type of SLM that is operable to controllably alter the phase of light. Non-limiting examples of SPMs are LCoS devices and deformable mirrors. Some embodiments apply SPMs that have a pitch (i.e. a spacing between adjacent pixels in rows and/or columns) of about 10 μm or less.

Some SLMs operate only to modulate light amplitude. Some SLMs operate to modulate light phase. Some SLMs operate to modulate both light amplitude and light phase. Operation of some SLMs may be dynamically controlled in real time to:

modulate light amplitude only;

modulate light phase only; or modulate both light phase and light amplitude.

"f-number" is a dimensionless number that can be used to characterize an optical system. f-number is a ratio of a focal length of the optical system to a diameter of an entrance pupil of the optical system.

"highlight", in reference to a projected light field (which may include an image), means a bright spot or area. Highlights may include the brightest points in a light field.

"highlight beam" as used herein includes a beam of light that produces a non-uniform light field which includes one or more highlights at a target area. The target area may for example be a screen or image plane onto which the highlight beam is incident. The highlight beam may include areas having higher illumination intensities and areas having lower illumination intensities. A highlight beam may for example result from light steering.

"modulate" means to vary a property of something. Light can be modulated temporally or spatially. Example properties of light that may be modulated include amplitude (brightness or intensity), phase and polarization state. Spatial modulation of light can be achieved by selectively attenuating light at spatial locations (e.g. pixels) and/or by steering light. Light steering involves steering light that would otherwise illuminate some spatial locations to other spatial locations. Light steering may be achieved, for example, using variable lenses, variable mirrors and/or phase modulators (e.g. SPMs). A phase pattern applied by a SPM may direct incident light to selected regions in an image plane. Interference between different parts of the directed light may result in some locations in the image plane having more light (i.e. constructive interference) and/or some locations in the image plane having less light (i.e. destructive interference). As a result of such interference, the phase pattern applied by the SPM may effectively steer or direct incident light away from certain regions in the image plane and/or steer or direct the incident light so that light is concentrated in certain regions in the image plane.

"numerical aperture" or "NA" for an optical system is a dimensionless number that provides a measure of the range of angles of incoming light that can pass through the optical system. NA is given by the product of the index of refraction of the medium through which incoming light arrives at the optical system and the sine of the maximum angle of light rays that will pass through the optical system relative to an optical axis of the optical system.

"acceptance angle" for an optical system is a solid angle for which light rays entering the optical system with directions lying within in the solid angle will pass through the optical system. Solid angle may be measured in steradians.

"etendue" is a number that characterizes how "spread out" light is in area and angle. From the point of view of an optical system the etendue may be defined as the area of an entrance pupil of the optical system times the acceptance angle (as defined herein) of the optical system.

Description

One aspect of this invention relates to combining plural light beams. An example application is to combine beams of light from different light sources onto an imager in a light projection system. In some embodiments some or all of the beams of light are modulated light. The modulation of the modulated light may be time varying.

In some embodiments the techniques described herein are applied to produce dynamic illumination of a projector imager. For example, plural beams may be modulated and then combined to illuminate the imager with light that varies with intensity over an active surface of the imager. The modulation applied to the beams may be controlled to match images that the imager is controlled to display. For example, the different beams of light may each be modulated by a different SLM and then combined as described herein to illuminate an imager (or combined for some other purpose).

Where the light is being used to display video or digital cinema images comprising a sequence of frames the modulation of the modulated light of one or more beams may be set on a frame-by-frame or scene-by-scene basis. For example, the imager may be controlled by image data comprising video frames and the modulation applied to the beams may vary for the different frames.

In some embodiments one or more of the beams is a base light beam. A base light beam may, for example, provide uniform illumination or illumination that is modulated in a static (non-time-varying) way. For example the base beam (s) may supply enough light to an imager to project a desired image and one or more other beams may be modulated to supply extra light for highlights.

In some embodiments some or all of the combined beams of light are premodulated according to image data such that more light is provided in areas of an imager that correspond to brighter parts of an image to be displayed and less light is provided in areas of the imager that correspond to dimmer parts of the image.

An example application of the present technology is to illuminate at least one area of an imager or other target with modulated light that has high intensity at selected locations.

A SLM may have a reduced life span or may be damaged or destroyed if it is used to modulate light having an intensity greater than the SLM is designed for. This problem may be avoided by combining two or more lower-intensity beams of light that are each modulated by a separate SLM.

Another problem that may be avoided or reduced by combining plural beams of light is that it may be desirable to use plural lower-power light sources to generate the light instead of a single higher-power light source. This may be motivated for example by cost, availability, and/or thermal management issues.

By combining light beams which are modulated by plural SLMs, the energy of the combined beams may be spread over the plural SLMs. This arrangement may permit the use of less-expensive SLMs and/or simplify thermal management (e.g. to keep the operating temperature of the SLMs within a desired range) and/or extend the expected mean time between failures of the SLMs. In some embodiments the plural SLMs comprise a total of N SLMs where each SLM is illuminated by, and is operable to modulate, a beam of light having an intensity that is about 1/N of the desired total averaged intensity of the combined beams.

Embodiments which combine light from plural SLMs can facilitate providing high intensity illumination of a projector imager with light of the wavelength and polarization of the beams.

Another problem is that, in some applications it is desirable to combine different beams of light that may not consistently or at all have different spectra or different polarizations that would permit combination of the different beams using conventional light combiners such as a dichroic mirror (which may be used to combine two beams of light having different wavelengths) or a polarizing beam splitter (which may be used to combine two beams of light having different polarizations). A typical dichroic mirror cannot be used to efficiently combine beams that have the same wavelength or wavelengths that differ from one another by less than at least about 10 nm. A typical polarizing beam splitter, which may be used to combine beams, operates most efficiently for orthogonal polarization states.

An example application in which this problem may arise is where an imager is of a type that requires illumination by light having a specific polarization and it is desired to combine two light beams of the same colour and the same polarization.

In some embodiments of the present technology different beams of light that have spectra and polarization states that are either the same or very close to the same or not consistently different (i.e. sometimes they are the same or nearly the same) may be combined. For example, the beams of light may all have the same specific polarization (e.g. a polarization direction matched with a polarization direction required by an imager).

For example, the plural light beams may have the same or effectively the same wavelength and the same or a similar polarization. Here, effectively the same wavelength means that at least 95% or at least 98% of the energy of the plural light beams is within a wavelength band that spans no more than 30 nm or no more than 20 nm or no more than 10 nm—thereby making it impractical and/or inefficient to use a dichroic element to efficiently combine the light beams. Here, first and second light beams have "similar polarization states" if a polarizing beam splitter set to pass a maximum amount of the light energy of the first light beam will also pass at least 50% or at least 70% or at least 85% of a maximum amount of the light energy of the second light beam that the polarizing beam splitter can pass-thereby making it impractical or inefficient to use a polarizing beam splitter as a light combiner to combine the light of the first and second light beams (without first adjusting polarization states of the first and/or second light beams to be more nearly orthogonal using additional optical elements). In some embodiments the methods and apparatus described herein are applied to combine two beams of light that have the same circular polarization state.

In some embodiments, the light of the beams that are combined is:
 unpolarized (e.g. randomly polarized);
 has a polarization that varies in space and/or time; or
 has a fixed polarization.
In some embodiments, the beams that are combined comprise light that:
 is monochrome;
 has a bandwidth of 18 nm or less or 12 nm or less or 5 nm or less or 3 nm or less;
 has a wavelength that is the same for the different beams; and/or
 has a wavelength that differs from that of the other beams by not more than 5 nm or 10 nm or 15 nm.
In some embodiments the light in the plural light beams is generated by plural corresponding light sources.

In some embodiments each of the light beams is spatially modulated by a corresponding monochrome SLM (i.e. a SLM that does not include colour filters to allow separate control of light of different primary colours).

In some embodiments the beams that are combined comprise light that is coherent. In some embodiments the beams that are combined collectively comprise light of slightly different wavelengths. For example the light may be light from laser sources that emit light of a combination of slightly different wavelengths. This helps in de-speckling.

In some embodiments SLMs are provided by phase modulators (e.g. SPMs) which are each controlled to steer light of one of the beams and different ones of the beams are made up of narrow band light having slightly different wavelengths. Each of the SLMs may be controlled to steer the light of the corresponding beam based on the wavelength of light in the corresponding beam. Typically such SLMs will work better (e.g. more efficiently steer the light) if the wavelengths of light in the corresponding beam are within a small range around the wavelength(s) that each of the SLMs is set for (e.g. within about ±10 nm of a wavelength for which an SLM is set to steer).

FIG. 1 schematically illustrates a projection system 10 according to an example embodiment of the present invention. First and second light beams 12A and 12B (generally and collectively beams 12) converge on an image plane 13 at a relative angle α. α may be a small angle. For example, in some embodiments α is about 10 degrees or less or about 5 degrees or less. Each of light beams 12 arrives at image plane 13 at an angle that is within an acceptance angle 11 of an optical system of which image plane 13 is a part.

Light beams 12A and 12B respectively comprise light emitted by light sources 14A and 14B modulated by SLMs 15A and 15B (generally and collectively SLMs 15) and optionally passed through sets of one or more optical elements 16A and 16B. Optical elements 16A and 16B may, for example comprise one or more lenses, mirrors, prisms, filters, free space, or the like.

In some advantageous embodiments SLMs 15 comprise spatial phase modulators that are controlled to exhibit patterns of phase shifts that cause light incident on SLMs 15 to be steered onto image plane 13. In this manner light incident on SLMs 15 may be concentrated at locations on image plane 13 at which greater light intensity is desired and/or steered away from locations on image plane 13 at which lower light intensity is desired.

Pixels of SLMs 15 may be set to present a phase pattern that causes a desired level of focus of a pattern of light onto image plane 13. In some such embodiments no additional focusing optics are provided to focus light from beams 12 onto image plane 13. Focus may be provided, for example by setting pixels of the phase modulators to emulate a focusing lens in combination with optics for desired light steering.

Control system 28 for the phase modulators may comprise a data processor configured to deliver control signals to set pixels of the phase modulators to have a desired phase pattern. The data processor may, for example process image data to determine a desired light steering pattern and drive the phase modulators to steer light to achieve the desired light steering pattern.

The present invention is not limited to the case where SLMs 15 are phase modulators and are controlled to steer light. However, light steering using phase modulators may be implemented in any of the embodiments described herein.

In some embodiments each SLM 15 is individually driven and/or controlled. In some embodiments light in different beams 12 corresponds to different colours (e.g. red, green, and blue). Each colour may have a different target profile (e.g. different light intensity profile, different polarization, etc.).

In some embodiments light in different beams 12 has different intensity profiles (e.g. light in beam 12A has a first intensity profile and light in beam 12B has a second intensity profile different from the first intensity profile) that when combined result in a desired target light intensity profile. Light in the different beams 12 which comprise different intensity profiles may be the same colour or may be of different colours.

A single SLM 15 or a set of SLMs 15 may be driven to produce a beam (or beams) 12 having the target characteristics desired for the corresponding colour. For example, a first set of SLMs 15 may be driven to produce a desired beam 12 corresponding to red light, a second set of SLMs 15 may be driven to produce a desired beam 12 corresponding to green light and a third set of SLMs 15 may be driven to produce a desired beam 12 corresponding to blue light. Within a specific set of SLMs 15 the individual SLMs 15 may be driven collectively (i.e. all of the SLMs in the set are controlled in the same manner) or individually (i.e. different SLMs in the set are controlled differently) to compensate for performance variations of each of the SLMs or to optimize efficiency. Efficiency may, for example, be optimized by having each of the SLMs concentrate on a portion of the target image (e.g. to generate a more efficient composition of the target image).

In some embodiments different SLMs 15 are controlled differently to create a combined image at image plane 13 that could not (or would be very difficult) to obtain if all SLMs 15 were controlled in the same manner or a single SLM 15 was used. For example, different SLMs 15 may be individually controlled to steer light in beams 12 differently to create a desired image at image plane 13.

In some embodiments light beams corresponding to the different colours are combined using dichroic combination (e.g. with dichroic mirrors which pass one wavelength band and reflect another). After such combination the light beams corresponding to the different colours will share a common optical axis and therefore the same spot location in angular space.

Light in beams 12 combines to create a combined image at image plane 13 which is spaced apart from SLMs 15. Light in beams 12 may have any combination of the characteristics described above. In some embodiments which have significant commercial application beams 12 comprise light having the same polarization and wavelength.

Light beams 12 overlap at image plane 13. In some embodiments light beams 12 all illuminate the same area on image plane 13. In some embodiments the light of each of light beams 12 is modulated with the same pattern and at image plane 13 light beams 12 are registered with one another so that in each part of the image formed at image plane 13 the same parts of the patterns in each of light beams 12 overlap and reinforce one another.

In FIG. 1 the image at image plane 13 provides dynamic illumination to an optical system 17. In projector system 10, optical system 17 comprises a projector imager 19. SLMs 15 may be controlled to modulate the light in beams 12. For example SLMs 15 may be each controlled to apply the same modulation to the corresponding beam 12. The modulation may, for example be determined at least in part from image data defining an image to be displayed by projection system 10.

In some embodiments projector imager 19 is positioned very close to or coincides with image plane 13. In some embodiments projector imager 19 is positioned farther from image plane 13. An optional optical system 18 comprising a set of one or more optical elements may be provided to direct light from image plane 13 to projector imager 19. The light incident on projector imager 19 is further modulated by projector imager 19 and projected by a projection lens 20.

In some embodiments light beams 12 are shaped to illuminate a region of a specific size and shape at image plane 13. For example, in some applications an eventual image may have a particular aspect ratio. For example an aspect ratio (width:height) of 16:9 is common. Light beams 12 may, for example have an aspect ratio of 16:9 when they arrive at image plane 13. In some embodiments light beams 12 have an aspect ratio when they arrive at image plane 13 that matches an aspect ratio of imager 19.

Variations in the angles of light incident at image plane 13 may impact the telecentricity of projection system 10. In some such cases angular footprints of SLMs 15 may vary dynamically. Additionally, or alternatively, the angular footprints may not be constant over an entire image on image plane 13. To minimize adverse effects, optical system 17 may be chosen to telecenter an average steering profile of SLMs 15.

The present technology is not limited to two beams 12 but may be practiced with any suitable number of beams 12 (e.g. 2, 3, 4, 5, 6, 7, 8 beams, etc.).

It can be appreciated that the combination of beams 12 is done via angular combination (thus combination of etendue). This mode of combining beams 12 does not rely on the light of beams 12 to have any particular polarization or wavelength. This mode of combining can combine light from different beams 12 that have the same wavelength and the same polarization.

Angular space is a representation in which radial distance from an origin to a point represents an angle and an angular position of the point around the origin represents azimuth. Angular space may be defined for a particular optical system such that the origin corresponds to an optical axis of an entrance pupil of the optical system (e.g. optical system 17 described elsewhere herein).

FIG. 2. shows an example angular space. Origin 21 indicates an angle corresponding to an optical axis. Dashed circles 22A, 22B, 22C (collectively or generally dashed circles 22) represent specific angles relative to the optical axis. Different points around any one of dashed circles 22 correspond to different azimuthal directions. For example, circles 22A, 22B, 22C could respectively represent angles of one, two and three degrees relative to the optical axis or angles of two, four and six degrees relative to the optical axis. Different points around any one of dashed circles 22 correspond to different azimuthal directions. Solid circle 23 indicates the boundary of the acceptance angle for the optical system. Light incident on an entrance pupil of the optical system at an angle greater than the acceptance angle indicated by circle 23 is not properly processed by the optical system. Light incident on an entrance pupil having the same incident angle relative to the optical axis as well as the same azimuthal angle corresponds to the same point in angular space (e.g. two parallel rays correspond to the same point in angular space, all points in real space that are located along a ray emanating from a center of the entrance pupil of the optical system may be associated to the ame point in angular space, etc.).

In FIG. 2 patches 24A and 24B respectively represent footprints in angular space of light rays that originate from SLM 15A and SLM 15B (collectively or generally footprints 24). SLMs 15 can be positioned in real space so that their footprints 24 in angular space are close to one another. This can be done while allowing the positions of SLMs 15 to be separated by any distance in real space.

SLMs 15 may be tilted to be perpendicular to the direction of the corresponding beams 12. SLMs 15 may optionally all be tilted by the same amount or may individually be tilted by different amounts.

Any number of SLMs 15 may be arranged in real space to deliver light to imager 19 (or another target) as long as their footprints 24 in angular space are within the acceptance angle of the optical system in question (e.g. optical system 17)—i.e. within circle 23 in the example of FIG. 2.

The angles between beams 12 (e.g. angle α) may be chosen freely as long as the footprints 24 corresponding to beams 12 are within the acceptance angle e.g. the angle indicated by circle 23. In embodiments in which there are more than two beams 12, it is optional but not required that all of beams 12 combine with the same angle.

The angles between beams 12 may be selected to accommodate physical limitations of hardware and/or to facilitate desired image quality. For any number of beams 12 it is generally beneficial to arrange beams 12 so that the combining angle α is minimized. Combining beams 12 with a small angle α can help by:

minimizing geometric distortions; and/or conserving angular space within the acceptance angle (this allows for image quality improvement).

Image quality improvements may be achieved by placing an optical diffuser 13A in or close to image plane 13. Diffuser 13A scatters light that is incident on the diffuser through a range of angles. The angular scattering characteristics of diffuser 13A may be chosen such that light from footprints 24 in angular space is mixed and angular space is more nearly filled, with minimal light falling outside the acceptance angle. A strength of diffuser 13A may be selected to fill the acceptance angle (i.e. f-number) of the optical system (e.g. optical system 17) as described elsewhere herein.

In some embodiments projector system 10 comprises plural diffusers 13A. For example, a first diffuser may be placed in or close to image plane 13 and a second diffuser may be placed in or close to projector imager 19. The light scattering provided by the plural diffusers 13A is additive (linearly or non-linearly). Different ones of the plural diffusers may be identical or may have at least one property that is different from other ones of the plural diffusers. A desired amount of light scattering may be achieved by scattering the light by plural diffusers 13A.

Additionally, or alternatively, projector system 10 may comprise at least one additional optical relay between image plane 13 and projector imager 19. A diffuser 13A may be placed in or close to a plane of the additional optical relay.

In some embodiments a projector system 10 comprises three different image planes 13 (e.g. one image plane for each of 3 colour channels). For example, projector system 10 may comprise a first image plane 13 corresponding to a red colour channel, a second image plane 13 corresponding to a green colour channel and a third image plane 13 corresponding to a blue colour channel. A diffuser 13A may be placed in or close to each of the three image planes 13. Such projector system 10 may also comprise an additional optical relay between the image planes 13 and projector imager 19. The additional optical relay may combine the beams from the three image planes 13 (e.g. using dichroic mirrors). A diffuser 13A is optionally provided in or close to a plane of the additional optical relay.

In some embodiments diffuser 13A is rotationally symmetric (i.e. it scatters light equally in all directions). In some other embodiments diffuser 13A is asymmetric and scatters light more strongly in some directions than in others.

Diffuser 13A may enhance safety by limiting the maximum radiance of light at any specific angle.

Particularly if footprints 24 are closely packed near the origin of angular space one can optimize filling of angular space up to the boundary of the acceptance angle by selecting diffuser 13A to scatter light. Such optimizations may improve quality factors such as:

accommodating asymmetric pupils (e.g. D-shape pupils) in optical system 17. If the angular footprints are well mixed and centered it is possible to avoid clipping one angular footprint 24 more than others.

diffuser 13A may reduce laser speckle (when beams 12 comprise coherent light—e.g. were light sources 14 provide narrow band laser illumination).

avoiding colour shifts due to angular dependences of optical components in the optical path of a projection device.

In some embodiments diffuser 13A is an asymmetric diffuser. For example, such an asymmetric diffuser may scatter light less along an axis along which angular footprints are combined while scattering light more along an axis that is orthogonal to the axis along which the angular footprints are combined.

Figure 3A:
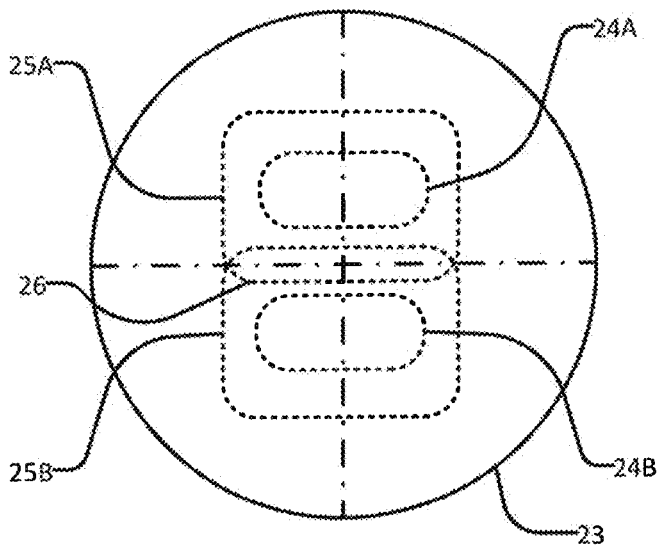
FIG. 3A is a schematic representation of an example arrangement of footprints in an angular space with two beams.
Figure 3B:
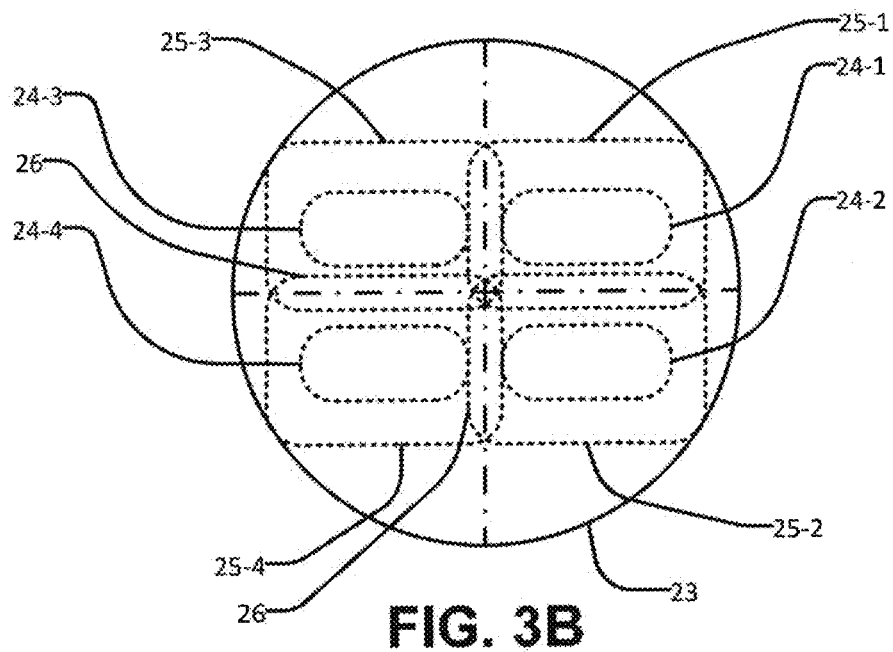
FIG. 3B is a schematic representation of an example arrangement of footprints in an angular space with four beams.

FIGS. 3A and 3B respectively illustrate example arrangements for footprints 24 in angular space for the case of two and four beams 12. In FIG. 3A, footprints 24A and 24B are spaced on either side of the origin in angular space. Where a diffuser 13A is present, the angular spread of light incident at image plane 13 is increased, resulting in enlarged effective footprints 25A and 25B which respectively correspond to footprints 24A and 24B. Effective footprints 25A and 25B overlap at region 26.

In FIG. 3B footprints 24-1 through 24-4 are clustered near the origin in angular space. Where a diffuser 13A is present, the angular spread of light incident at image plane 13 is increased, resulting in enlarged effective footprints 25-1 through 25-4 which respectively correspond to footprints 24-1 through 24-4. Effective footprints 25-1 through 25-4 overlap at regions 26.

FIGS. 3A and 3B illustrate that the presence of a diffuser 13A can increase coverage of angular space. By selecting a diffuser 13A that scatters light through a larger range of angles the overlap 26 between effective footprints 25 may be increased and the amount of the available angular space inside the acceptance angle (i.e. inside circle 23) is increased. However, if diffuser 13A scatters light through too large an angle and/or if footprints 24 are located too close to circle 23, a significant amount of light from beams 12 may be scattered at angles outside of the acceptance angle (for which angles the light cannot be effectively utilized).

FIGS. 3C through 3H illustrate one benefit of arranging beams 12 to converge with a small angle α and providing footprints 24 close to the origin in angular space. In FIGS. 3C, 3D and 3E centers of footprints 24A and 24B are separated by angles α0, α1 and α2 respectively with α0<α1<α2. This results in the highest angle (outermost) parts of footprints 24 being separated from circle 23 by corresponding angles d0, d1 and d2, where d0>d1>d2.

The proximity of footprints 24 to circle 23 limits the degree to which the acceptance angle (angular space inside circle 23) can be filled by providing a diffuser to spread light of beams 12 through a wider range of angles without wasting light by having some light spread to angles that are outside of the acceptance angle (outside of circle 23).

FIG. 3F shows that when footprints 24 are close to the origin in angular space it is possible to apply a diffuser that spreads light through a relatively wide angle to obtain effective footprints 25A and 25B that fill much of the angular space within circle 23 without significant spill over of light outside of circle 23. The spreading of light also causes a large area of overlap 26 between effective footprints 25A and 25B.

FIG. 3G shows that when footprints 24 are moved away from the origin in angular space the maximum angle of scattering that the diffuser can provide without spill over of light outside of circle 23 is reduced. In FIG. 3G effective footprints 25A and 25B still fill much of the angular space within circle 23 but less completely than in FIG. 3F. The area of overlap 26 between effective footprints 25A and 25B is also reduced relative to FIG. 3F.

FIG. 3H shows that when footprints 24 are still further from the origin of angular space the maximum angle of scattering that the diffuser can provide without spill over of light outside of circle 23 is reduced further to the point that effective footprints 25A and 25B no longer overlap and also effective footprints 25A and 25B occupy a relatively small part of the area within circle 23.

Increasing overlap in angular space between footprints 24 advantageously increases the likelihood of seeing a combination of light from the different SLMs 15 from an increased number of viewing angles. Typically, increasing overlap in angular space between footprints 24 additionally assists with reducing speckle. If the optical system (e.g. optical system 17) comprises an asymmetric aperture, light from one or more SLMs 15 will be cut disproportionately more than from one or more other SLMs 15.

In some embodiments systems as described herein include optical elements that fold light beams 12 such that light beams 12 converge on image plane 13 at angle α (as shown for example in FIG. 1) while SLMs 15 and/or light sources 14 are not aligned with the parts of light beams 12 that converge on image plane 13. An example of such a structure is illustrated in FIG. 4.

Figure 4:
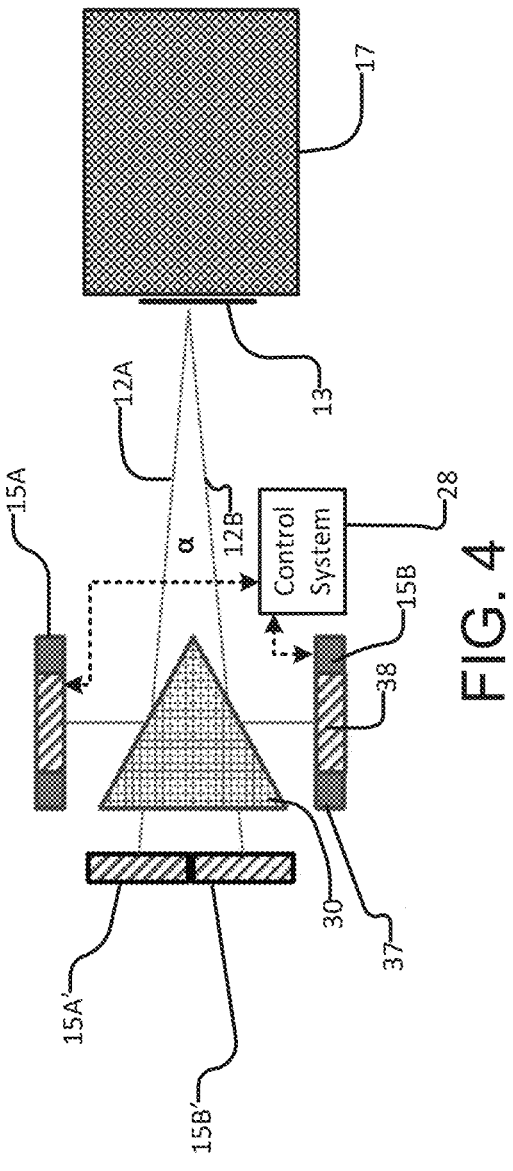
FIG. 4 is a schematic illustration of a projection system according to an example embodiment of the invention.

FIG. 4 shows a system in which light modulated by light modulators 15A and 15B is redirected to form beams 12A and 12B that converge toward image plane 13 at angle α. One or more optical elements may be provided to redirect the light. In the illustrated embodiment the redirection is provided by a prism 30. From the point of view of optical system 17, light modulators 15A and 15B appear to be at locations 15A' and 15B' respectively.

The arrangement of FIG. 4 advantageously allows flexibility in the positioning of SLMs 15 and can facilitate smaller angles α between different beams 12. The actual size of a SLM is often greater than the active area of the SLM. FIG. 4 shows that the apparent positions 15A' and 15B' can be located so that the active areas appear to be immediately next to one another even though the packaging 37 of SLMs 15A and 15B extends outside the active area 38.

Light for beams 12 is provided by one or more light sources 14. In some embodiments one light source 14 provides light for plural beams 12. In some embodiments light for each beam 12 is provided by a separate light source 14. Light sources 14 may be of any of a wide variety of types. Light sources 14 may be selected based on technical factors such as desired optical power output, desired wavelength or spectral composition, desired polarization state (as well as factors such as cost, durability, size, power requirements, operating temperature range, etc.).

In some embodiments light sources 14 comprise lasers. In some embodiments light sources 14 comprise solid state light emitters such as semiconductor lasers, laser diodes, light emitting diodes, etc.

In some embodiments it is desired that a light source 14 emits unpolarized light. Unpolarized light may, for example, be obtained by combining light from two lasers having orthogonal polarizations or by passing light from a laser through an optical element such as an optical fiber that depolarizes the laser light.

In typical applications it is desired that the light from light source 14 is well collimated. A desired degree of collimation may be achieved for example by using a light source such as a suitable laser that emits collimated light or by providing collimating optics.

Light from light source(s) 14 is directed to SLMs 15 for modulation. Where SLMs 15 are reflection type SLMs (e.g. LCoS devices), light from a light source 14 is directed onto an active area of a SLM 15 where the light is modulated and specularly reflected. The reflected modulated light is then provided as a beam 12 which travels to image plane 13 where it combines with light from other beams 12 as described herein.

In preferred embodiments light source 14:
produces light in a narrow wavelength band which corresponds to a wavelength band a particular SLM 15 on which the light will be incident upon is optimized for;
produces highly collimated light (e.g. may increase sharpness of the image on image plane 13);
polarizes light in a manner which corresponds to a particular SLM 15 (e.g. single polarization, split polarizations, etc.); and/or
produces light that is uniform in both the angular and spatial domain (non-uniformity may result in non-optimal illumination of a SLM 15, a point spread function of the system being spatially dependent, etc.).

Figure 5A:
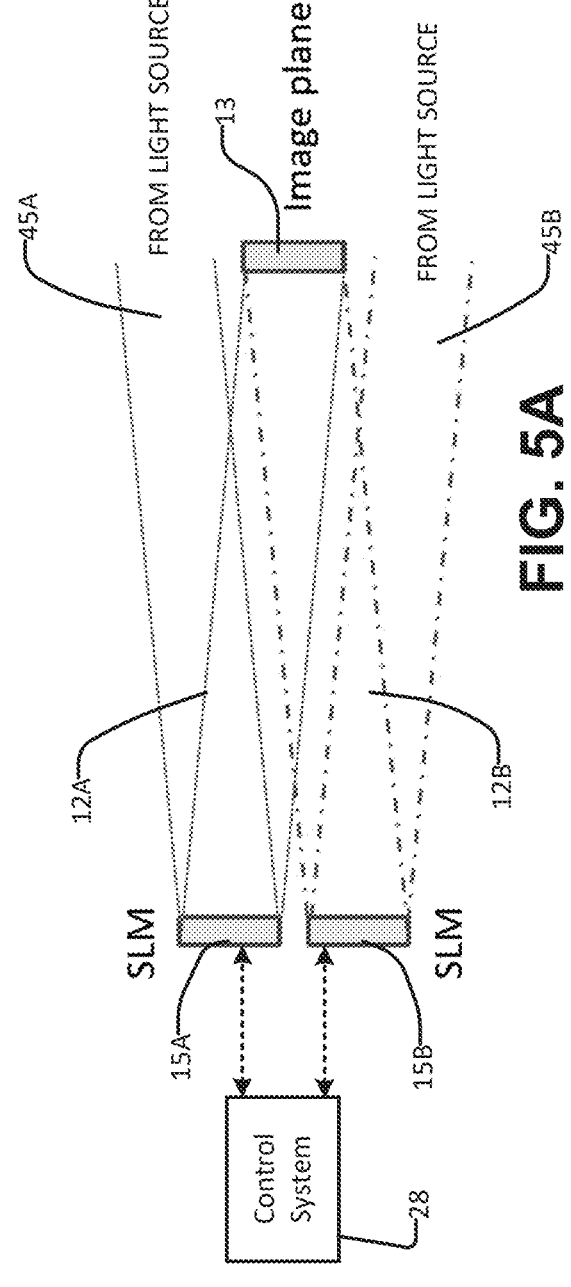
FIG. 5A is a schematic illustration of an optical arrangement according to an example embodiment of the invention.

FIG. 5A shows a simple embodiment in which light is directed from opposite sides of image plane 13 to illuminate active areas of each SLM 15 (e.g. beam 45A illuminates SLM 15A and beam 45B illuminates SLM 15B). After being reflected by SLMs 15 the light is directed in beams 12 (e.g. beams 12A and 12B) which converge toward image plane 13. In practice the arrangement illustrated in FIG. 5A can be inconvenient due to optical and mechanical constraints.

Figure 5B:
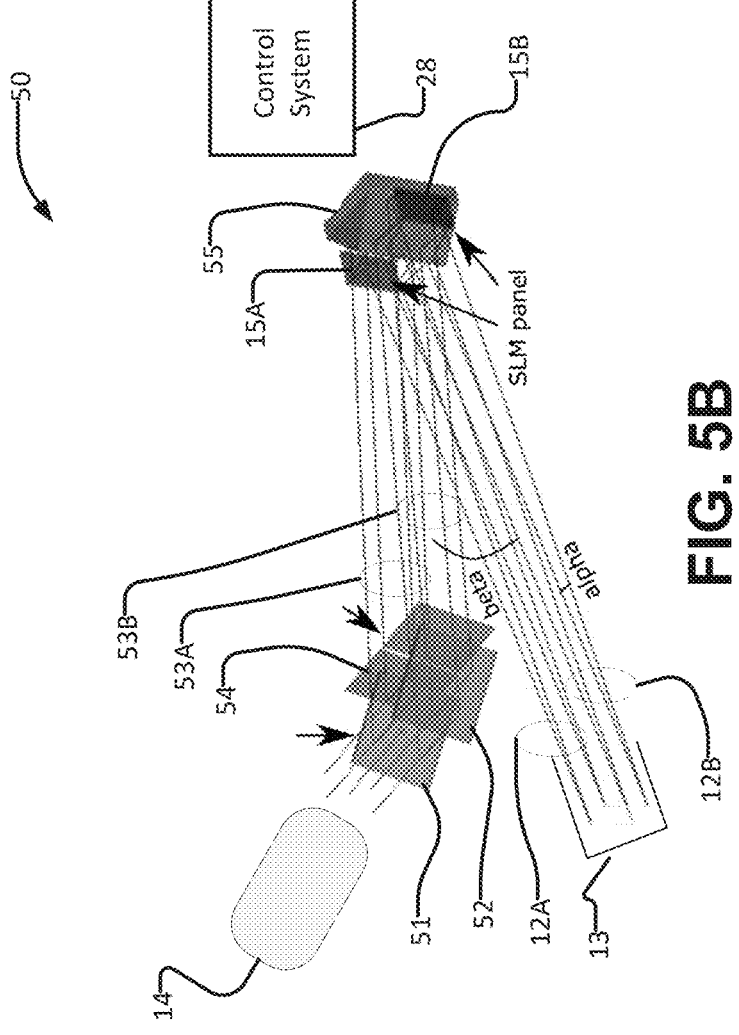
FIG. 5B is a schematic illustration of an optical arrangement according to an example embodiment of the invention.

FIG. 5B shows an optical arrangement 50 which is one example of a way to illuminate the active areas of SLMs 15 to yield beams 12. Optical arrangement 50 provides a 3D folded light path which facilitates positioning of components. Optical arrangement 50 also illustrates how a single light source 14 may illuminate active areas of two SLMs. Optical arrangement 50 also illustrates how the light directed to plural SLMs may be made to have the same polarization.

In this example, light source 14 emits a collimated beam of unpolarized light. The light passes to a polarizing beamsplitter 51. A portion of the light having one polarization (usually one half of the light) passes through polarizing beamsplitter 51 to a mirror 52. The rest of the light is reflected by polarizing beamsplitter 51. This results in two beams of light (53A, 53B) that are directed toward a prism 55 which redirects the light to illuminate active areas of SLMs 15A and 15B respectively. The light is reflected by SLMs 15A and 15B to provide beams 12A and 12B respectively which converge at angle α toward image plane 13.

Arrangement 50 may be constructed to cause the polarization state of beams 53A, 53B to be the same. This can be achieved by providing an optical element 54 (e.g. a wave plate) that changes the polarization state of one of beams 53A, 53B to match the polarization state of the other one of beams 53A, 53B. In some embodiments optical element 54 (or multiple optical elements 54) change(s) the polarization state of both of beams 53A, 53B. For example the polarization direction of one of beams 53A, 53B may be rotated by 90 degrees or the polarization direction of both of beams 53A, 53B may be rotated by 45 degrees.

In optical arrangement 50 beams 53A and 53B (generally and collectively beams 53) are folded relative to beams 12. Beams 53 form an angle β with beams 12. β may for example be about 20 degrees. β may be chosen such that beams 53 and beams 12 overlap only for a short distance. This structure can facilitate relatively unobstructed access to image plane 13 as well as easy coupling to light source 14. In the illustrated optical arrangement 50 beams 53A and 53B do not cross one another.

Figures 5C, 5D:
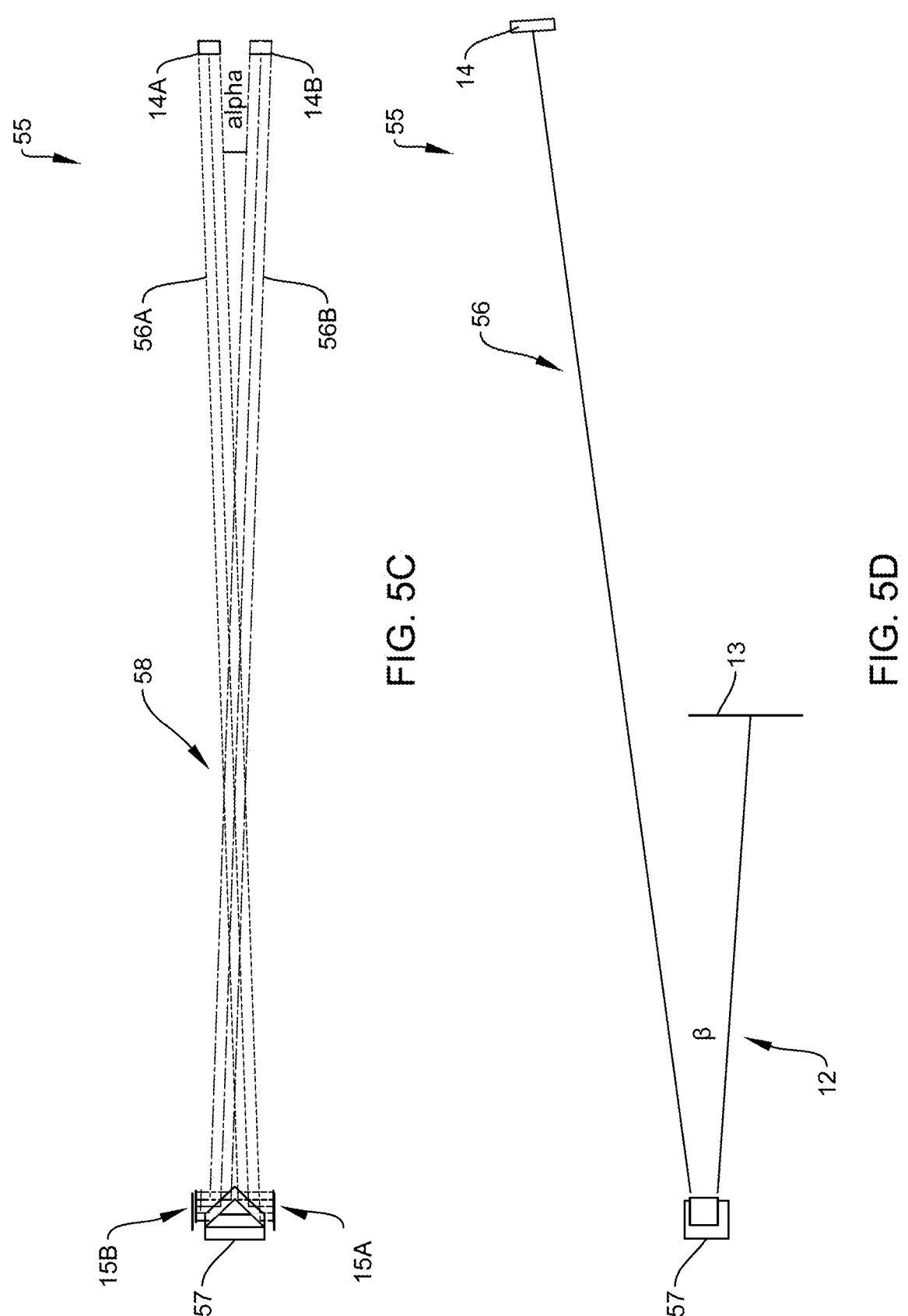
FIG. 5C is a plan view of an optical arrangement according to an example embodiment of the invention.
FIG. 5D is a schematic side elevation view of an optical arrangement according to an example embodiment of the invention.

FIG. 5C is a plan view of another example optical arrangement 55. Like optical arrangement 50, optical arrangement 55 provides an optical path formed with a 3D fold. In optical arrangement 55 illumination beams 56A and 56B (generally and collectively beams 56) from light sources 14A and 14B respectively cross each other at angle α before reaching prism 57 which redirects beams 56 to corresponding SLMs 15A and 15B. Beams 56 cross at location 58.

FIG. 5D is a schematic side elevation view of optical arrangement 55. As indicated schematically in FIG. 5D the light in beams 56 from light sources 14 angles toward prism 57 and beams 12 leave prism 57 at an angle to converge at image plane 13. In some embodiments image plane 13 is directly below the location 58 at which beams 56 cross. Optical arrangement 55 does not rely on tilting SLMs 15 to direct beams 12 to converge at angle α.

In optical arrangement 55 angle α is defined by the orientations of beams 56. Light can be incident on SLMs 15 perpendicularly in at least one plane. Thus optical arrangement 55 may provide reduced parallelogram distortion (i.e. distortion resulting from the SLM 15 being illuminated from a direction that is not normal to the plane of the SLM panel).

As discussed above light delivered to illuminate SLMs 15 may be folded by a fold angle β relative to light beams 12 that are delivered to an image plane 13. Fold angle β may be in a different plane from angle α by which beams 12 converge. The fold by angle β can facilitate making the location at which beams 12 converge on image plane 13 to be physically separated from light beams which deliver light to SLMs 15 (e.g. beams 53 or 56).

A small fold angle β would lead to a relatively large distance along beams 12 to achieve a desired separation distance between the location at which beams 12 converge on image plane 13 and the plane of beams that deliver light to SLMs 15. In some embodiments fold angle β is chosen to be relatively large (e.g. at least 9 degrees or at least 12 degrees or at least 15 degrees or at least 18 degrees). In some embodiments angle β is about 20°.

Figures 6A, 6B:
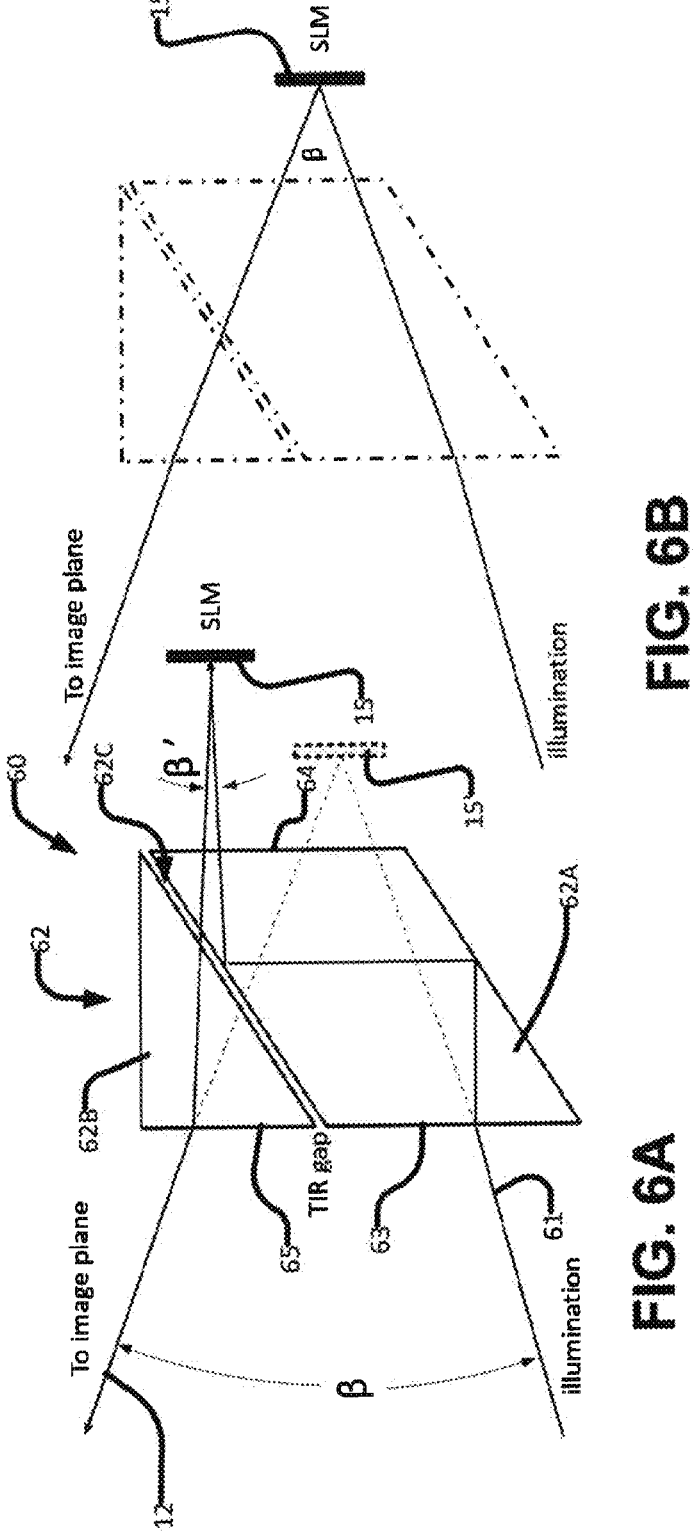
FIG. 6A is a schematic illustration of an optical arrangement according to an example embodiment of the invention.
FIG. 6B schematically illustrates an example light path.

However, as shown in FIG. 6B making fold angle β large may result in light being directed onto SLM 15 at a relatively large angle of incidence (relative to a vector normal to the active area of SLM 15). This can cause problems such as loss of bit depth, image compression, parallelogram distortion, pixel cross-talk, polarization alignment problems, and/or reduction of SLM panel lifetime.

FIG. 6A shows an optical arrangement 60 which includes a total internally reflecting (TIR) prism set 62. TIR prism set 62 comprises a first part 62A and a second part 62B separated by a small gap 62C of a material (e.g. air) that has a lower index of refraction than that of parts 62A and 62B. First and second prism parts 62A and 62B may, for example be made out of glass, fused silica or other optical materials.

An incoming light beam 61 can enter TIR prism set 62 at face 63 of first part 62A. First part 62A causes beam 61 to be displaced and to change angle. The light is totally internally reflected at interfaces of first part 62A before the light exits TIR prism set 62 and is delivered to SLM 15.

Light reflected from SLM 15 enters TIR prism set 62 at face 64. The returning light is not totally internally reflected at gap 62C and can travel through gap 62C. Transport of light across gap 62C may be enhanced by providing anti-reflection (AR) coating on the interfaces of parts 62A and 62B with gap 62C. The light modulated by SLM 15 passes through TIR prism set 62 to exit from face 65 of second part 62B.

In some embodiments, SLM 15 is mounted directly to first part 62A of TIR prism set 62.

The geometry of TIR prism set 62 causes outgoing beam 12 to be oriented at an angle β relative to incoming beam 61 (e.g. may appear as if beam 61 was reflected by a SLM at position 15'). However, the difference in the angles at which light is incident on SLM 15 and reflected by SLM 15 (angle β' in FIG. 6A) can be made much smaller than β, thereby reducing or alleviating at least some of the problems mentioned above.

In an example embodiment β' is less than 50% of β. For example, in some embodiments β is about 20 degrees and β' is about 8 degrees.

A TIR prism set may be used in conjunction with other optical arrangements as described herein. The same TIR prism set may be used to guide plural light beams modulated by plural SLMs 15. Additional SLMs may be included by placing the SLMs side by side or in an array in the same plane, by using a prism (e.g. a prism 30) or in any other manner described herein.

Figure 7A:
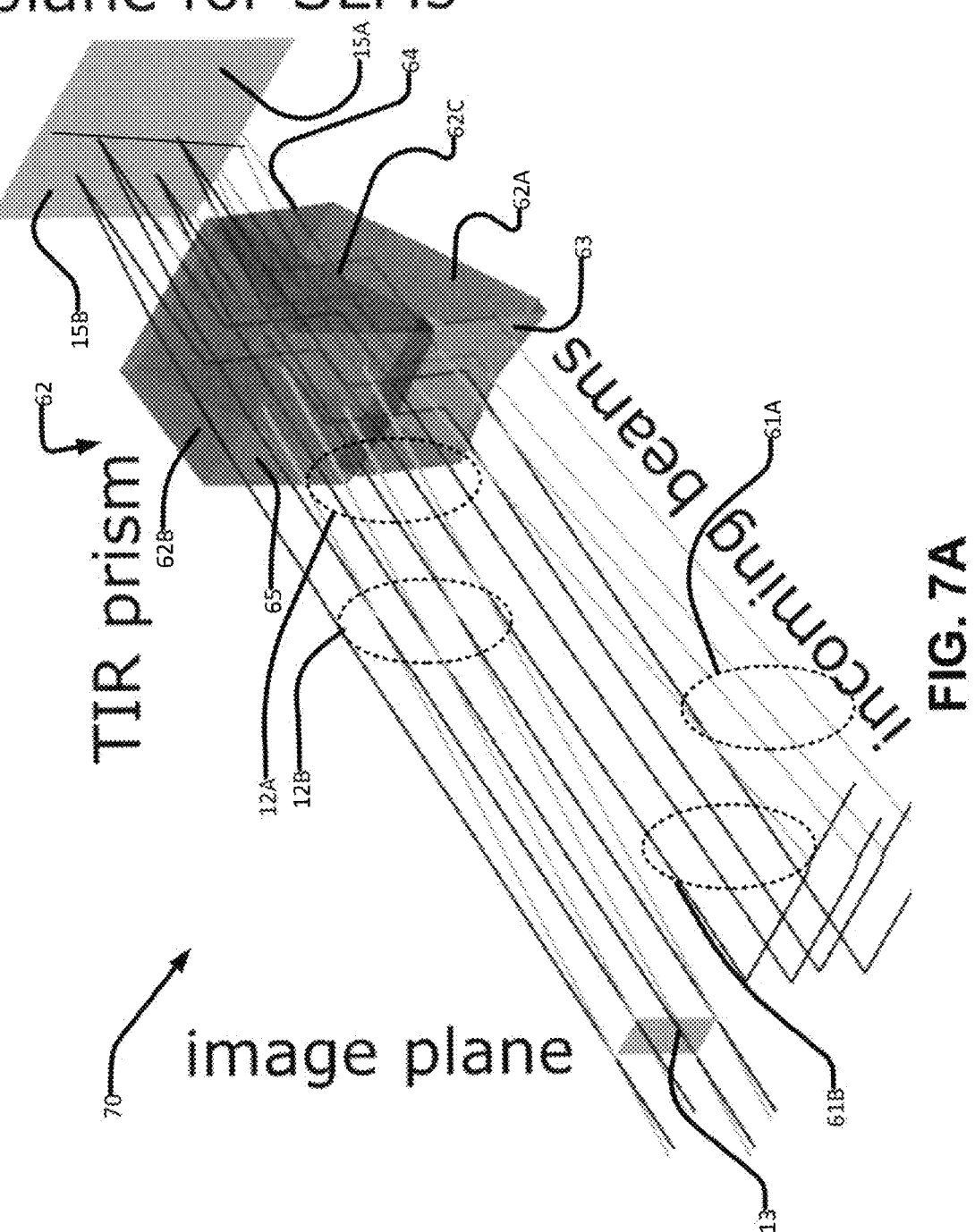
FIG. 7A is a schematic illustration of an optical arrangement according to an example embodiment of the invention.

FIG. 7A shows an optical arrangement 70 that includes a TIR prism set 62 and a pair of SLMs 15A and 15B. Illumination light beams 61A and 61B (which may be provided as described elsewhere herein or in any other manner) travel through first part 62A.

Beams 12 that have interacted with SLMs 15A and 15B travel back into TIR prism set 62 and leave TIR prism set 62 with an angle β relative to light beams 61.

In optical assembly 70 illumination light beams 61A and 61B may be oriented at angles so that they converge by angle α. In such embodiments beams 61A and 61B illumination reach SLMs 15 at directions determined by two angles, α and β'. For example, α may be about 5 degrees and β' may be about 8 degrees.

It is possible to add optical elements which cause beams 12 to converge with a relative angle α without requiring beams 61 upstream from SLMs 15 to converge with angle α. For example, face 65 of TIR prism set 62 may be formed to cause beams 12 to converge at angle α. This may be done, for example by forming face 65 as a concave dihedral.

Face 63 of TIR prism set 62 may be formed to adjust the relative angles of incoming beams 61A and 61B. For example, if beams 61A and 61B are converging when they reach face 63, face 63 may have angled facets that receive each of beams 61 and adjust beams 61 to be parallel or to have another desired angular relationship. The facets may make face 63 convex. In some embodiments the facets make face 63 concave.

Figures 7B, 7C:
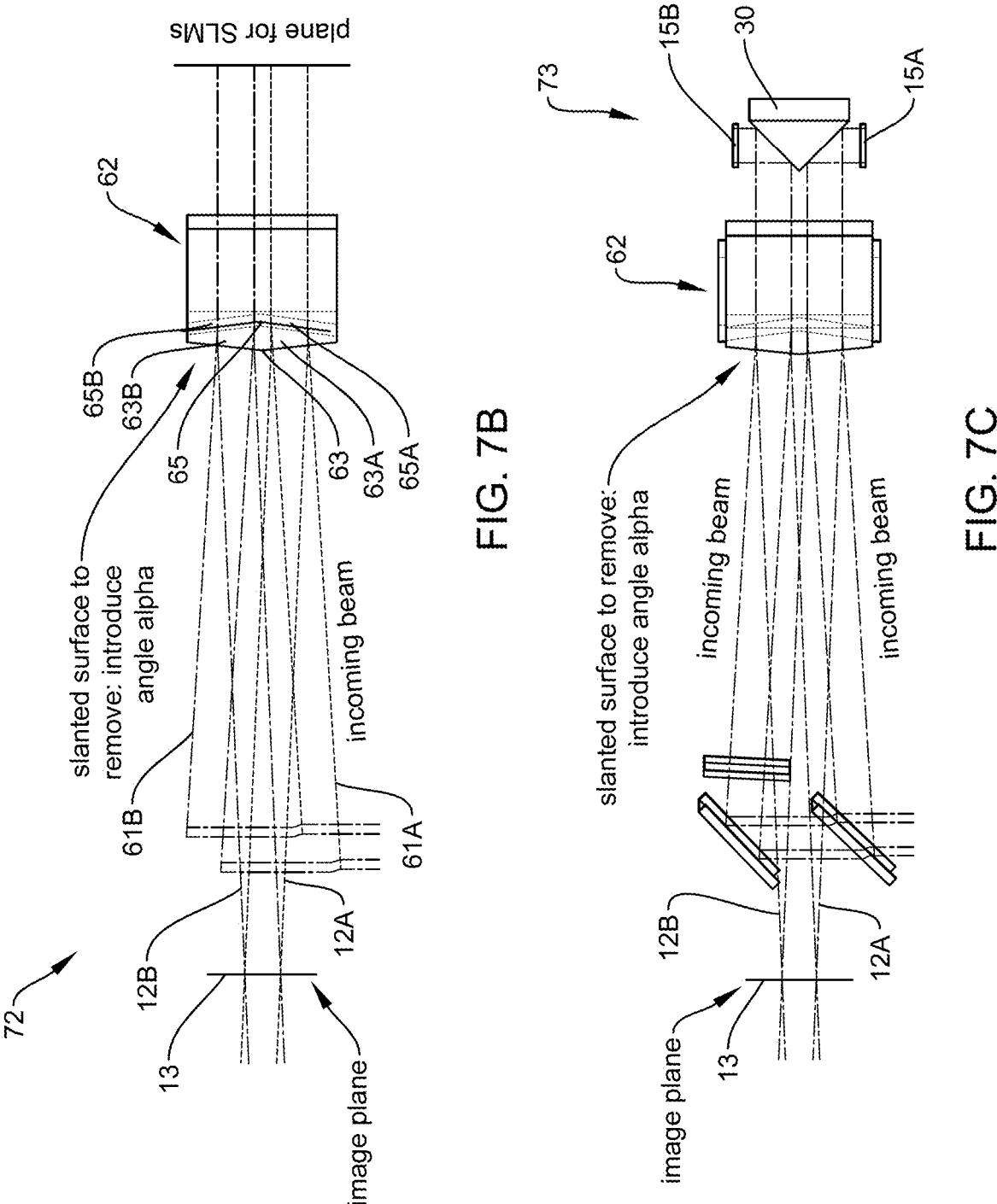
FIG. 7B is a schematic illustration of an optical arrangement according to an example embodiment of the invention.
FIG. 7C is a schematic illustration of an optical arrangement according to an example embodiment of the invention.

FIG. 7B shows an example optical arrangement 72 in which face 63 of TIR prism set 62 comprises two facets 63A and 63B that are angled relative to one another by a dihedral angle. Beam 61A enters face 63 at facet 63A and beam 63B enters face 63 at facet 63B. Refraction of beams 61A and 61B at facets 63A and 63B respectively may reduce or eliminate convergence of beams 61A and 61B and/or cause beams 61A and 61B to encounter SLMs 15A and 15B in a perpendicular direction in the plane of beams 61A and 61B.

In optical assembly 72 face 65 of TIR prism set 62 has facets 65A and 65B. Facets 65A and 65B are angled relative to one another. Beam 12A exits at facet 65A and beam 12B exits at facet 65B. Facets 65A and 65B may be angled to adjust beams 12A and 12B to converge at a desired angle α. For example facets 65A and 65B may be angled so that face 65 is convex and refraction of beams 12A and 12B at facets 65A and 65B makes beams 12A and 12B more convergent. In some embodiments beams 12A and 12B are parallel inside TIR prism set 62.

A TIR prism set 62 may be designed such that two or more SLMs 15 are directly mounted onto TIR prism set 62. For example, SLMs 15 may be put side by side or in an array on face 64 of TIR prism set 62. In some embodiments a prism that functions like prism 30 described elsewhere herein is integrated with TIR prism set 62. Such constructions may reduce losses by eliminating some air/glass interfaces. Also providing a prism 30 that is fixed to or unitary with a TIR prism set 62 may maintain alignment more reliably than separate parts.

FIG. 7C shows an example optical arrangement 73. Optical arrangement 73 is the same as optical arrangement 72 shown in FIG. 7B except that optical arrangement 73 comprises prism 30.

Figures 8A, 8B:
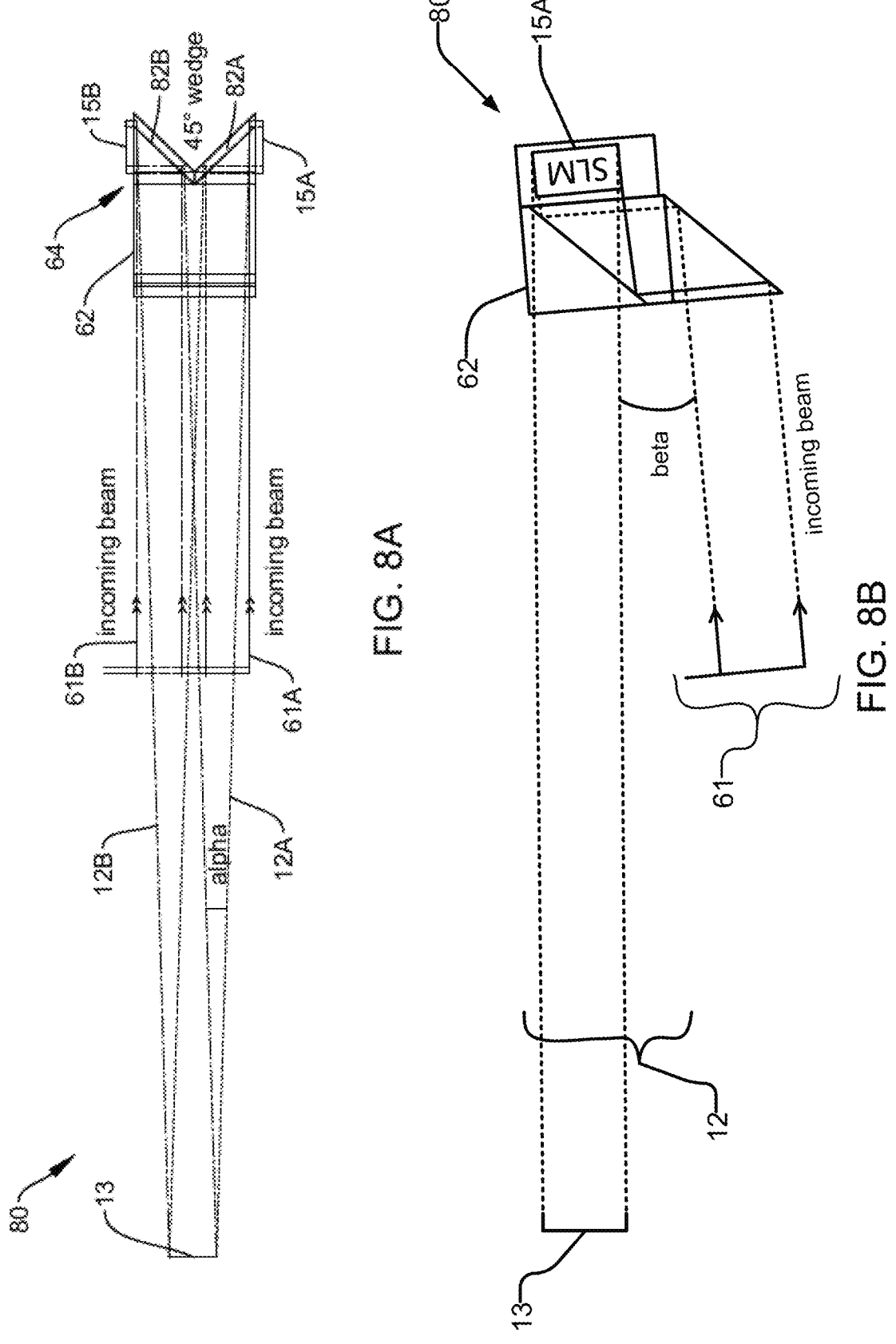
FIGS. 8A and 8B are top and side elevation views of an optical assembly according to an example embodiment of the invention.

FIGS. 8A and 8B are top and side elevation views of an example optical arrangement 80 that includes a TIR prism set 62 which supports plural SLMs 15. SLMs 15 may be in direct contact with a face of TIR prism set 62. In the illustrated embodiment face 64 of TIR prism set 62 is extended to include integral prisms 82A and 82B. Rear faces of prisms 82A and 82B are at 45 degrees to an axis of TIR prism set 62. SLMs 15A and 15B are mounted to side faces of integrated prisms 82A and 82B respectively.

Without limitation, some example dimensions that may apply to apparatus as described herein include:

SLMs 15 may have panel dimensions of about 15.5×8 mm²; and/or

A distance from a SLM panel 15 to image plane 13 may be about 150 mm; and/or

An f-number of a projection optical system 17 may be about F/4.5 which corresponds to a radius in angular space of about 6.4°; and/or A footprint 24 may span half angles in angular space of about 1.6°×0.85°; and/or A double angular footprint may span half angles in angular space of about 1.6°×2.1° (0.85+0.85+0.4); and/or A diffuser 13A may scatter light into a cone having a half angle of about 4°; and/or A half angle for converging beams 12 may be about 2.50° (corresponding to angle α being about 5°).

In some embodiments apparatus according to any of the embodiments described herein combines a highlight beam with a base light beam at or upstream from an imager. The base light beam may be combined with the highlight beam using the same angled geometry described herein (e.g. in any of FIGS. 4 to 8B). The base light beam may uniformly illuminate the imager. To facilitate this combination the base light beam may have an etendue that is comparable to the modulated light beam(s) with which it is combined. In preferred embodiments the etendues (or areas in angular space) of the base light beam and the modulated light beam are the same or similar (e.g. 10% or less difference).

Figure 9:
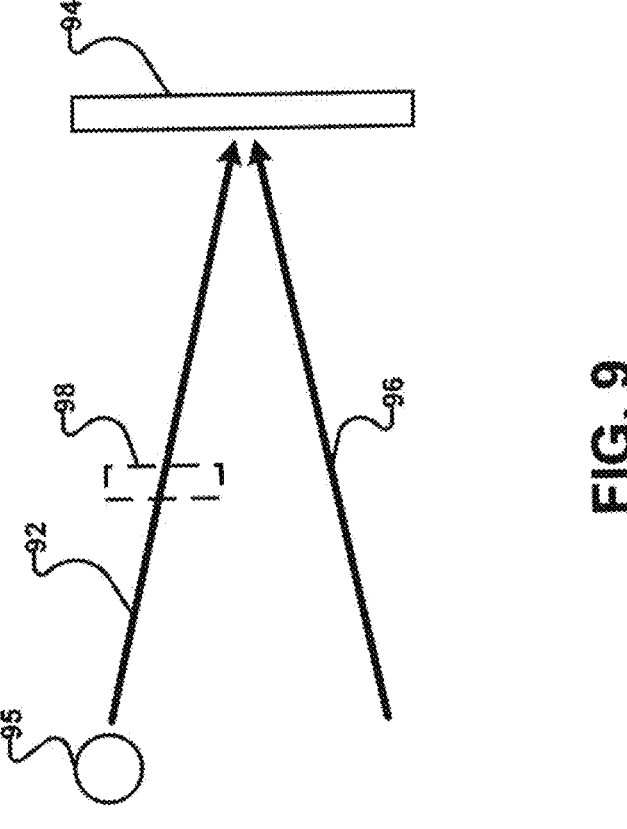
FIG. 9 is a schematic illustration of an optical apparatus according to an example embodiment of the invention.

FIG. 9 shows apparatus 90 according to an example embodiment in which a base light beam 92 is combined at an imager 94 with a modulated light beam 96. In this example, base light beam 92 is made up of light from a light source 95. Base light beam 92 may be homogenized and collimated to provide uniform illumination of imager 94. In some embodiments the optical path followed by base light beam 92 includes a holographic diffuser 98 that acts as a "frozen phase grating" making a fixed full screen pattern on imager 94. In some embodiments base light beam 92 is created by illuminating a holographic diffuser 98 with a highly collimated light source. In some embodiments base light beam 92 comprises white light.

In some embodiments the optical path taken by the base light beam has the same construction as the optical path taken by the modulated light beam (including that the light source is highly collimated) except that a SLM (e.g. an SPM) in the optical path of the base light beam is configured to with a phase pattern that presents a "frozen phase grating" such that base light beam 92 illuminates the target (e.g. image plane 13) with a fixed light pattern (e.g. a uniform light pattern). In some embodiments such SLM is replaced with a holographic diffuser (e.g. holographic diffuser 98) that acts as a "frozen phase grating". In such embodiments the light source may, for example be a light source that can put all of its output light into a fiber of dimensions on the order of 400×240 μm and NA 0.2.

In some embodiments a base light beam is realized by homogenizing light from a separate (laser) light source, for example by passing the light through an optical fiber with a rectangular cut and then projecting a magnified image of the rectangular cut onto target image 13. The collimated light source may, for example, be a light source that can put all of its output light into a fiber of dimensions on the order of 2×1.2 mm and NA 0.2.

In some embodiments SLMs 15 may be controlled (e.g. by applying an appropriate phase pattern) to direct unwanted light away from an image plane or image (e.g image plane 13). For example, SLMs 15 may be controlled to direct the unwanted light onto an aperture or apertures which can absorb the unwanted light. This advantageously can create high quality black regions of an image. In some embodiments the unwanted light is directed onto a cooled aperture.

In some embodiments light beams are aligned relative to one another and SLMs 15 such that the following conditions are satisfied:

unmodulated light reflected from each SLM 15 forms one uniform illumination on the image plane or imager; and patterns formed on each SLM 15 are matched together to form one aligned pattern.

In some cases iteration between the two conditions will be required prior to both conditions being satisfied.

In some embodiments a mismatch between unmodulated beams of light is compensated for by applying a corrective phase pattern to one or more SLMs 15. Additionally, or alternatively, applying a corrective phase pattern to a particular SLM 15 may compensate for performance defects present in the particular SLM 15.

In some embodiments positions and/or orientations of components of the apparatus described herein (e.g. light sources 14, SLMs 15, optical elements 16, etc.) are dynamically adjusted to align or re-align the components as desired. For example, the components may be coupled to automatically adjusting supports such as gimbals, movable mounting mechanisms, etc. which can vary the position or orientation of a coupled component.

In some embodiments, plural apparatuses according to any of the embodiments described herein are each applied to produce modulated light of a corresponding one of a plurality of different corresponding colours (e.g. red, green or blue). The modulated light of the different colours may be combined to yield a full colour image having a desired colour gamut. Any suitable technology may be used to combine the modulated light of the different colours.

The invention includes, without limitation, the following enumerated example embodiments:

1. A projection system comprising:
   one or more light sources operative to emit light;
   optical elements arranged to direct the light from the one or more light sources in two or more separate collimated beams, each of the beams illuminating the active area of the imager, the beams converging onto the image plane at an acute angle not exceeding 10 degrees;
   wherein the optical elements include a spatial light modulator arranged to modulate the light of at least one of the beams.

2. The projection system according to example embodiment 1 or any other example embodiment herein comprising an imager having an active area that coincides with or is adjacent to the image plane.

3. The projector system according to example embodiment 2 or any other example embodiment herein wherein each of the light beams has an aspect ratio when they arrive at the image plane that matches an aspect ratio of the imager.

4. The projection system according to example embodiment 1 or any other example embodiment herein comprising an optical system having an entrance pupil that coincides with or is adjacent to the image plane.

5. The projector system according to example embodiment 1 or any other example embodiment herein comprising an optical diffuser located in or adjacent to the image plane.

6. The projection system according to any of example embodiments 1 to 5 or any other example embodiment herein wherein the optical elements comprise a TIR prism set, the beams enter the TIR prism set with a relative angle of more than 10 degrees and the beams exit the prism at the acute angle.

7. The projection system according to example embodiment 6 or any other example embodiment herein wherein the TIR prism set is formed with a concave dihedral and the beams enter the TIR prism set at respective facets of the concave dihedral.

8. A projector system, the system comprising:
   one or more light sources operable to emit first and second beams of monochromatic collimated light, the first and second beams having wavelengths that are the same or differ by not more than 10 nm;
   a first spatial light modulator (SLM) illuminated in an optical path of the first beam of light;
   a second SLM located in an optical path of the second beam of light;
   wherein the first and second beams of light overlap at an image plane that coincides with or is imaged onto a projector imager.

9. The projector system according to example embodiment 8 or any other example embodiment herein wherein the first and second SLMs comprise spatial phase modulators.

10. The projector according to example embodiment 9 or any other example embodiment herein comprising a controller connected to control the first and second spatial phase modulators to steer light in the respective first and second beams away from one or more areas on the image plane and/or to concentrate light from the respective first and second beams at one or more selected highlight areas on the image plane.

11. The projector according to example embodiment 10 or any other example embodiment herein wherein the controller is configured to control the first and second spatial phase modulators to focus the steered light on the image plane.

12. An apparatus for generating images including highlights, the apparatus comprising:
a first spatial light modulator (SLM) in a first optical path of a first beam of light;
a frozen phase grating in a second optical path of a second beam of light;
wherein the first and second optical paths bring the first and second beams of light to converge and overlap at an image plane;
a controller configured to control the first spatial light modulator to steer the light of the first beam toward highlight areas in the image plane.

13. The apparatus according to example embodiment 12 or any other example embodiment herein wherein the frozen phase grating is configured to cause the light of the second beam to uniformly illuminate the area of overlap of the first and second beams at the image plane.

14. The apparatus according to example embodiment 13 or any other example embodiment herein comprising an optical system having an entrance pupil at or adjacent to the image plane, the optical system having an acceptance angle wherein the light from the first and second beams incident on the image plane is within the acceptance angle.

15. The apparatus according to example embodiment 14 or any other example embodiment herein wherein the optical system comprises projection optics and a projection imager and the image plane coincides with or is imaged onto the projection imager.

16. A projector system comprising:
a plurality of spatial light modulators (SLMs) operable as phase modulators, each of the SLMs illuminated by a light beam, each of the SLMs configured to steer a respective corresponding light beam to a common target image plane;
wherein the light steered to the common target image plane illuminates a an imager in the optical path.

16. The projector system according to example embodiment 15 or any other example embodiment herein comprising a controller configured to control each of the SLMs to concentrate light from the corresponding light beam at selected highlight locations on the image plane.

17. The projector system according to example embodiment 16 or any other example embodiment herein wherein the controller is configured to control each of the SLMs with control signals that compensate for differences between the SLMs.

18. The projector system according to example embodiment 16 or 17 or any other example embodiment herein wherein the controller is configured to cause the highlight locations for each of the light beams to coincide on the image plane.

19. The projector system according to example embodiment 16 or 17 or any other example embodiment herein wherein the controller is configured to cause at least one of the highlight locations for one of the light beams to be at a highlight location that does not coincide on the image plane with any of the highlight locations for one or more other ones of the light beams.

20. An apparatus according to any of example embodiments 16 to 19 or any other example embodiment herein wherein angles of incidence of the first and second beams at the common target image plane are smaller than a boundary in angular space of an acceptance angle of an optical system that includes the imager.

21. The apparatus according to example embodiment 20 or any other example embodiment herein wherein footprints of the first and second beams in angular space lie within the boundary of the acceptance angle.

22. An apparatus according to example embodiment 20 or any other example embodiment herein wherein the angles between directions of incidence of the first and second beams on the image plane and a normal to the image plane is no more than % of the angle corresponding to the boundary of the acceptance angle of the imager.

23. An apparatus according to example embodiment 20 or any other example embodiment herein wherein the angles between directions of incidence of the first and second beams on the image plane and a normal to the image plane is no more than $\frac{1}{3}$ of the angle corresponding to the boundary of the acceptance angle of the imager.

24. An apparatus according to any one of example embodiment s 1 or 3 to 6 or any other example embodiment herein comprising at least one diffuser in the optical path between the image plane and the imager that increases the angular spread of the combined beam of light.

25. An apparatus according to any one of example embodiment s 1, 8, 12, 16 or any other example embodiment herein wherein the beams of light are modulated to illuminate at least one region of the image plane with light having an intensity that is greater than an intensity of light illuminating another region of the image plane.

26. An apparatus according to any one of example embodiment s 1 to 25 or any other example embodiment herein wherein the plural light beams have effectively the same wavelength range and same polarization.

27. An apparatus according to any one of example embodiment s 1 to 26 or any other example embodiment herein wherein the light in the plural light beams is generated by plural corresponding light sources.

28. An apparatus according to example embodiment 27 or any other example embodiment herein wherein the light sources comprise laser light sources.

29. An apparatus according to any one of example embodiment s 1 to 28 or any other example embodiment herein wherein each of the light beams is spatially modulated by a corresponding monochrome SLM.

30. An apparatus according to any of example embodiments 1 to 29 or any other example embodiment herein wherein the SLMs are configured to modulate the beams of light to dynamically illuminate a projector imager.

31. An apparatus according to any one of example embodiments 1 to 30 or any other example embodiment herein wherein the plural beams of light are modulated and then combined to illuminate the imager with light that varies with intensity over an active surface of the imager.

32. An apparatus according to any one of example embodiments to 31 or any other example embodiment herein wherein the modulation applied to the beams of light is controlled to match images that the imager is controlled to display.

33. The apparatus according to example embodiment 32 or any other example embodiment herein wherein the images are images for frames of a video sequence.

34. The apparatus according to example embodiment 33 or any other example embodiment herein wherein the images are images for one colour channel for frames of a video sequence.

35. An apparatus according to example embodiment 31 to 34 or any other example embodiment herein wherein the imager is controlled to process image data comprising video frames and the modulation applied to the beams varies for the different frames.

36. An apparatus according to any one of example embodiments 1 to 35 or any other example embodiment herein wherein the beams of light which are combined comprise unpolarised light.

37. An apparatus according to any one of example embodiments 1 to 35 or any other example embodiment herein wherein the beams of light which are combined comprise light having a polarization that varies in space and/or time.

38. An apparatus according to any one of example embodiments 1 to 35 or any other example embodiment herein wherein the beams of light which are combined comprise light having a fixed polarization.

39. An apparatus according to any one of example embodiments 1 to 38 or any other example embodiment herein wherein the beams that are combined comprise light that:
is monochrome;
has a bandwidth of 18 nm or less or 12 nm or less or 5 nm or less or 3 nm or less;
has a wavelength that is the same for the different beams; and/or
has a wavelength that differs from that of the other beams by not more than 5 nm or 10 nm or 15 nm.

40. An apparatus according to any one of example embodiments 1 to 39 or any other example embodiment herein wherein the beams of light that are combined comprise light that is coherent.

41. An apparatus according to any one of example embodiments 1 to 40 or any other example embodiment herein wherein the beams of light that are combined converge on the image plane at a relative angle α.

42. An apparatus according to example embodiment 41 or any other example embodiment herein wherein a is a small angle.

43. An apparatus according to example embodiment 41 or 42 or any other example embodiment herein wherein a is about 10 degrees or less.

44. An apparatus according to example embodiment 41 or 42 or any other example embodiment herein wherein a is about 5 degrees or less.

45. An apparatus according to any one of example embodiments 1 to 44 or any other example embodiment herein wherein each of the beams of light arrives at the image plane at an angle that is within a boundary of the acceptance angle of an optical system of which the image plane is a part.

46. An apparatus according to any one of example embodiments 1 to 45 or any other example embodiment herein wherein each of the beams of light pass through a corresponding set of one or more optical elements.

47. An apparatus according to example embodiment 46 or any other example embodiment herein wherein the optical elements comprise one or more lenses, mirrors, prisms, filters and free space.

48. An apparatus according to any one of example embodiments 1 to 47 or any other example embodiment herein wherein the beams of light comprise light having the same polarization and wavelength range.

49. An apparatus according to any one of example embodiments 1 to 48 or any other example embodiment herein wherein the beams of light all illuminate the same area on the image plane.

50. An apparatus according to any one of example embodiments 1 to 49 or any other example embodiment herein wherein the light of each of the light beams is modulated with the same pattern and at the image plane the light beams are registered with one another so that in each part of the image formed at the image plane the same parts of the patterns in each of the light beams overlap and reinforce one another.

51. An apparatus according to any one of example embodiments 1 to 50 or any other example embodiment herein wherein the image at the image plane provides dynamic illumination to an optical system.

52. An apparatus according to example embodiment 51 or any other example embodiment herein wherein the optical system comprises a projector imager.

53. An apparatus according to any one of example embodiments 1 to 52 or any other example embodiment herein wherein each SLM is controlled to apply the same modulation to its corresponding beam of light.

54. An apparatus according to any one of example embodiments 1 to 53 or any other example embodiment herein wherein the modulation applied by each SLM is determined at least in part from image data defining an image to be displayed by the apparatus.

55. An apparatus according to any one of example embodiments 1 to 54 or any other example embodiment herein wherein the imager is positioned very close to or coincides with the image plane.

56. An apparatus according to any one of example embodiments 1 to 55 or any other example embodiment herein wherein the imager is spaced apart from the image plane.

57. An apparatus according to example embodiment 56 or any other example embodiment herein comprising an optical system positioned between the imager and the image plane, the optical system comprising a set of one or more optical elements operable to direct light from the image plane to the imager.

58. An apparatus according to example embodiment 57 or any other example embodiment herein wherein the light incident on the imager is further modulated by the imager and projected by a projection lens.

59. An apparatus according to any one of example embodiments 1 to 58 or any other example embodiment herein wherein the light beams are shaped to illuminate a region of a specific size and shape at the image plane.

60. An apparatus according to example embodiment 59 or any other example embodiment herein wherein the light beams have an aspect ratio that matches an aspect ratio of the imager.

61. An apparatus according to example embodiment 60 or any other example embodiment herein wherein the light beams have an aspect ratio (width:height) of 16:9.

62. An apparatus according to any one of example embodiments 1 to 61 or any other example embodiment herein comprising two light beams.

63. An apparatus according to any one of example embodiments 1 to 61 or any other example embodiment herein comprising more than two light beams.

64. An apparatus according to any one of example embodiments 1 to 63 or any other example embodiment herein wherein the combination of the light beams is done via angular combination (etendue).

65. An apparatus according to any one of example embodiments 1 to 64 or any other example embodiment herein wherein a footprint in angular space of each SLM is within the boundary of the acceptance angle of the corresponding optical system.

66. An apparatus according to any one of example embodiments 1 to 65 or any other example embodiment herein wherein all of the beams combine with the same angle α.

67. An apparatus according to any one of example embodiments 1 to 65 or any other example embodiment herein wherein at least two of the beams combine with different angles α.

68. An apparatus according to any one of example embodiments 1 to 67 or any other example embodiment herein wherein the angles between the beams are selected to accommodate physical limitations of hardware and/or to facilitate desired image quality.

69. An apparatus according to any one of example embodiments 1 to 68 or any other example embodiment herein wherein the combining angle α is minimized.

70. An apparatus according to any one of example embodiments 1 to 69 or any other example embodiment herein comprising an optical diffuser in the image plane.

71. An apparatus according to example embodiment 70 or any other example embodiment herein wherein the diffuser scatters light that is incident on the diffuser through a range of angles.

72. An apparatus according to example embodiment 70 or 71 or any other example embodiment herein wherein angular scattering characteristics of the diffuser are such that light from footprints in the angular space is mixed and the angular space is more nearly filled with minimal light falling outside the boundary of the acceptance angle.

73. An apparatus according to any one of example embodiments 70 to 72 or any other example embodiment herein wherein the diffuser is rotationally symmetric.

74. An apparatus according to any one of example embodiments 70 to 73 or any other example embodiment herein wherein the diffuser is asymmetric and scatters light more strongly in some directions than in others.

75. An apparatus according to any one of example embodiments 70 to 74 or any other example embodiment herein wherein filling of the angular space up to the boundary of the acceptance angle is optimized by varying properties of the diffuser.

76. An apparatus according to any one of example embodiments 70 to 75 or any other example embodiment herein wherein the diffuser reduces laser speckle.

77. An apparatus according to any of example embodiments 1 to 76 comprising one or more optical elements arranged to bend or fold the light beams such that the light beams converge on the image plane at angle α while the SLMs and/or light sources are not aligned with the parts of the light beams that converge on the image plane.

78. An apparatus according to example embodiment 77 or any other example embodiment herein wherein at least one of the one or more optical elements that bend or fold the light beams comprises a prism.

79. An apparatus according to any one of example embodiments 1 to 78 or any other example embodiment herein comprising at least one light source operable to provide light for the beams.

80. An apparatus according to any one of example embodiments 1 to 79 or any other example embodiment herein wherein one light source provides light for plural beams.

81. An apparatus according to any one of example embodiments 1 to 79 or any other example embodiment herein wherein light for each beam is provided by a separate light source.

82. An apparatus according to any one of example embodiments 79 to 81 or any other example embodiment herein wherein the one or more light sources comprise lasers.

83. An apparatus according to any one of example embodiments 79 to 81 or any other example embodiment herein wherein the one or more light sources comprise solid state light emitters.

84. An apparatus according to example embodiment 83 or any other example embodiment herein wherein the solid state light emitters consist of one or more of lasers, laser diodes and light emitting diodes.

85. Apparatus for illuminating a target area, the apparatus comprising:
   at least one light source arranged to direct light to a plurality of spatial light modulators the spatial light modulators operable to output beams of modulated light wherein the beams of modulated light are arranged to converge to the target area with a converging angle α and to create overlapping light fields at the target area.

86. Apparatus according to example embodiment 85 or any other example embodiment herein wherein the angle α does not exceed 10 degrees.

87. Apparatus according to example embodiment 85 or 86 or any other example embodiment herein wherein the spatial light modulators are spatial phase modulators and the apparatus includes a controller connected to deliver control signals to the spatial phase modulators, the control signals setting phase shifts for pixels of the spatial phase modulators which combine to provide a phase pattern that steers the light from the at least one light source to concentrate light at some locations on the target area and/or to steer light away from some locations on the target area.

88. Apparatus according to example embodiment 87 or any other example embodiment herein wherein the controller is configured to control the pixels of the spatial phase modulator to focus the light onto an image plane at the target area.

89. Apparatus according to example embodiment 85 or 87 or any other example embodiment herein wherein the controller is configured to apply the same control signals to each of the plurality of spatial phase modulators.

90. Apparatus according to any of example embodiments 85 to 89 or any other example embodiment herein wherein the target area is at an entrance pupil of an optical system having an acceptance angle and the light beams converge to the target area within the acceptance angle.

91. Apparatus according to example embodiment 90 or any other example embodiment herein wherein in angular space footprints corresponding to the beams of modulated light are clustered toward an origin of the angular space.

92. Apparatus according to example embodiment 91 or any other example embodiment herein comprising an optical diffuser at or near to the target area wherein the optical diffuser is operative to scatter light from the beams of modulated light within the acceptance angle.

93. Apparatus according to example embodiment 92 or any other example embodiment herein wherein the light scattered by the diffuser occupies at least 60% or 70% or 80% or 90% of a total area within the boundary of the acceptance angle in angular space.

94. Apparatus according to example embodiment 92 or any other example embodiment herein wherein the light scattered by the diffuser causes light from the different beams to overlap in angular space.

95. Apparatus according to example embodiment 94 or any other example embodiment herein wherein the light beams are each collimated.

96. Apparatus according to example embodiment 95 or any other example embodiment herein wherein the light from the at least one light source comprises incident light beams in a first plane and the output beams are in a second plane and the second plane is tilted relative to the first plane by an angle β.

97. Apparatus according to example embodiment 96 or any other example embodiment herein wherein the angle β is at least ten degrees or at least fifteen degrees.

98. Apparatus comprising:
plural spatial phase modulators, each illuminated by a light beam from a highly collimated light source;
a control system configured to set each of the phase modulators to apply phase shifts so as to steer light to a common target or image plane to provide a corresponding light field at the target that includes areas of greater light intensity and areas of less light intensity;
wherein the light fields overlap at the target and are co-registered so that corresponding areas in the overlapping light fields are superposed.

99. The apparatus according to example embodiment 98 or any other example embodiment herein wherein the combination of the light steered by the different phase modulators is effected by directing light from the different phase modulators to converge at an acute angle α onto the target area or image plane.

100. The apparatus according to example embodiment 98 or 99 or any other example embodiment herein comprising an imager located to be illuminated by the combined light field at the target.

101. The apparatus according to example embodiment 100 or any other example embodiment herein wherein the imager comprises a spatial amplitude modulator.

102. The apparatus according to any one of example embodiments 98 to 101 or any other example embodiment herein wherein angles between the optical axes of each phase modulator to the common target image, are smaller than ⅓ of a maximum boundary of the acceptance angle of an optical system that includes the imager.

103. The apparatus according to any of example embodiments 98 to 102 or any other example embodiment herein comprising at least one optical diffuser provided in an optical path between the common target and the imager.

104. The apparatus according to any of the preceding example embodiments comprising a TIR prism set as described herein.

105. Apparatus as illustrated in any of FIGS. 1 to 9.

106. A method for supplying light for high intensity highlights in projected images, the method comprising combining plural light beams in which light is steered to highlight locations in an image plane wherein the plural light beams may illuminate the same set of one or more imagers.

107. The method according to example embodiment 106 or any other example embodiment herein wherein the projected images have highlights of at least 4000 lumen over a 15000 lumen baseline.

108. A method for supplying light for high intensity highlights in projected images, the methods comprising at an imager combining at least one modulated light beam generated with an apparatus according to any one of the example embodiments herein with a base light beam.

109. The method according to example embodiment 108 or any other example embodiment herein wherein an optical path of the base light beam comprises a holographic diffuser.

110. The method according to example embodiment 119 or any other example embodiment herein wherein the holographic diffuser acts as a frozen phase grating.

111. The method according to example embodiment 118 or any other example embodiment herein wherein an optical path of the base light beam comprises a SLM configured as a frozen phase grating.

112. The method according to example embodiment 111 or any other example embodiment herein wherein the SLM is a SPM.

113. Apparatus having any new and inventive feature, combination of features, or sub-combination of features that are described herein.

114. Methods having any new and inventive steps, acts, combination of steps and/or acts or sub-combination of steps and/or acts that are described herein.

Interpretation of Some Terms

Unless the context clearly requires otherwise, throughout the description and the claims:
"comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms "about" when referencing a numeric value means a value within ±10% of the stated numeric value unless the context requires otherwise.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Control systems (e. g. for controlling SLMs, SAMs or SPMs may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs"). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a projector may implement methods as described herein by executing software instructions in a program memory accessible to the processors.

Where a component (e.g. an optical element, modulator, light source, lens, assembly, device, arrangement, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments" or as being "for example". Such features are not mandatory and may not be present in all embodiments. Embodiments of the invention may include zero, any one or any combination of two or more of such features. All possible combinations of such features are contemplated by this disclosure even where such features are shown in different drawings and/or described in different sections or paragraphs. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B even if the descriptions of Features A and B are illustrated in different Figures and/or described in different sentences, paragraphs or sections of this application (unless the description states otherwise or features A and B are fundamentally incompatible).

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A projector system comprising:

one or more light sources operable to emit first and second beams of monochromatic collimated light, the first and second beams having wavelengths that are the same or differ by not more than 10 nm;

a first spatial light modulator (SLM) illuminated in an optical path of the first beam of light;

a second SLM located in an optical path of the second beam of light;

wherein the first and second beams of light overlap at an image plane that coincides with or is imaged onto a projector imager;

wherein the first and second SLMs comprise spatial phase modulators; and a control system connected to control the first and second spatial phase modulators to steer light in the respective first and second beams away from one or more areas on the image plane and/or to concentrate light from the respective first and second beams at one or more selected highlight areas on the image plane.

2. The projector system according to claim 1 wherein the control system is configured to control the first and second spatial phase modulators to focus the steered light on the image plane.

3. A projector system comprising:

a plurality of spatial light modulators (SLMs) operable as phase modulators, each of the SLMs illuminated by a light beam, each of the SLMs configured to steer a respective corresponding light beam to a common target image plane;

a control system configured to control each of the SLMs to concentrate light from the corresponding light beam at selected highlight locations on the image plane;

wherein the light steered to the common target image plane illuminates an imager in the optical path.

4. The projector system according to claim 3 wherein the control system is configured to control each of the SLMs with control signals that compensate for differences between the SLMs.

5. The projector system according to claim 3 wherein the control system is configured to cause the highlight locations for each of the light beams to coincide on the image plane.

6. The projector system according to claim 3 wherein the control system is configured to cause at least one of the highlight locations for one of the light beams to be at a highlight location that does not coincide on the image plane with any of the highlight locations for one or more other ones of the light beams.

7. The projector system according to claim 3 wherein angles of incidence of the first and second beams at the common target image plane are smaller than a boundary in angular space of an acceptance angle of an optical system that includes the imager.

8. The projector system according to claim 7 wherein footprints of the first and second beams in angular space lie within the boundary of the acceptance angle.

9. The projector system according to claim 7 wherein the angles between directions of incidence of the first and second beams on the image plane and a normal to the image plane is no more than ½ of the angle corresponding to the boundary of the acceptance angle of the imager.

10. The projector system according to claim 7 wherein the angles between directions of incidence of the first and second beams on the image plane and a normal to the image plane is no more than ⅓ of the angle corresponding to the boundary of the acceptance angle of the imager.

11. Apparatus for illuminating a target area, the apparatus comprising:

at least one light source arranged to direct light to a plurality of spatial light modulators, the spatial light modulators operable to output beams of modulated light wherein the beams of modulated light are arranged to converge to the target area with a converging angle and to create overlapping light fields at the target area;

wherein the spatial light modulators are spatial phase modulators and the apparatus includes a control system connected to deliver control signals to the spatial phase modulators, the control signals setting phase shifts for pixels of the spatial phase modulators which combine to provide a phase pattern that steers the light from the at least one light source to concentrate light at some locations on the target area and/or to steer light away from some locations on the target area.

12. The apparatus according to claim 11 wherein the converging angle does not exceed 10 degrees.

13. The apparatus according to claim 11 wherein the control system is configured to control the pixels of the spatial phase modulator to focus the light onto an image plane at the target area.

14. Apparatus for illuminating a target area, the apparatus comprising:

at least one light source arranged to direct light to a plurality of spatial light modulators, the spatial light modulators operable to output beams of modulated light wherein the beams of modulated light are arranged to converge to the target area with a converging angle and to create overlapping light fields at the target area;

wherein the apparatus includes a control system that is configured to apply the same control signals to each of the plurality of spatial phase modulators.

15. Apparatus for illuminating a target area, the apparatus comprising:

at least one light source arranged to direct light to a plurality of spatial light modulators, the spatial light modulators operable to output beams of modulated light wherein the beams of modulated light are arranged to converge to the target area with a converging angle and to create overlapping light fields at the target area;

wherein the target area is at an entrance pupil of a projection optical system having an acceptance angle and the light beams converge to the target area within the acceptance angle.

16. The apparatus according to claim 15 wherein angular space footprints corresponding to the beams of modulated light are clustered toward an origin of the angular space.

17. The apparatus according to claim 16 comprising an optical diffuser at or near to the target area wherein the optical diffuser is operative to scatter light from the beams of modulated light within the acceptance angle.

* * * * *